United States Patent

Chauvette

[11] 3,925,372
[45] Dec. 9, 1975

[54] ALPHA-AMINOACYL-3-HALO CEPHALOSPORINS

[75] Inventor: Robert R. Chauvette, Indianapolis, Ind.

[73] Assignee: Eli Lilly and Company, Indianapolis, Ind.

[22] Filed: Apr. 1, 1974

[21] Appl. No.: 457,153

Related U.S. Application Data

[63] Continuation-in-part of Ser. No. 335,381, Feb. 23, 1973, abandoned.

[52] U.S. Cl. .............................. 260/243 C; 424/246
[51] Int. Cl.$^2$ ............................. C07D 501/20
[58] Field of Search ........................ 260/243 C

[56] References Cited
UNITED STATES PATENTS 3,705,897  12/1972  Murphy .................... 260/243 C

*Primary Examiner*—Richard J. Gallagher
*Assistant Examiner*—Anne Marie T. Tighe
*Attorney, Agent, or Firm*—William B. Scanlon; Everet F. Smith

[57] ABSTRACT

α-Aminoacyl-3-halo cephalosporins represented by the formula

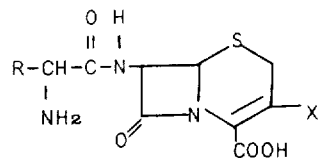

wherein R is phenyl, substituted phenyl, thienyl or furyl; and X is fluoro, chloro, bromo or iodo and the non-toxic pharmaceutically acceptable salts thereof are valuable, orally effective antibiotics.

10 Claims, No Drawings

ALPHA-AMINOACYL-3-HALO CEPHALOSPORINS

CROSS REFERENCE TO RELATED APPLICATIONS

This application is a continuation in part application of co-pending application Ser. No. 335,381 filed Feb. 23, 1973 now abandoned.

BACKGROUND OF THE INVENTION

This invention relates to the cephalosporin class of antibiotics. In particular it relates to certain 7-α-aminoacyl-3-halo-3-cephem-4-carboxylic acids which are therapeutically useful antibiotic compounds.

Several 7-α-aminoacyl cephalosporin antibiotics with varying substituents in the 3-position of the molecule are known. For example, the well-known antibiotic cephalexin, 7-(D-α-phenylglycylamido)-3-methyl-3-cephem-4-carboxylic acid, a deacetoxycephalosporanic acid which has a methyl group in the 3-position; the antibiotic cephaloglycine, 7-(D-α-phenylglycylamido)-3-acetoxymethyl-3-cephem-4-carboxylic acid, a cephalosporanic acid having an acetoxymethyl in the 3-position; and the α-aminoacyl cephalosporins described in U.S. Pat. No. 3,641,021 wherein the 3-position is substituted by a thiadiazolthiomethyl or tetrazolthiomethyl moiety are all valuable therapeutic agents. Also a number of cephalosporin compounds have been described wherein the molecule is substituted in the 3-position by a 3-halomethyl group. For example, 3-bromomethyl-3-cephem-4-carboxylic acid esters are described in U.S. Pat. Nos. 3,647,788 and 3,668,203. 3-Bromomethyl-2-cephem-4-carboxylic acid esters have also been described in U.S. Pat. No. 3,637,678. The 3-halomethyl cephalosporin esters which have been described are disclosed as useful intermediates for the preparation of cephalosporin antibiotics.

The halo cephalosporin compounds provided by this invention are structurally unique compounds of the cephalosporin class in that the halogen atom is attached directly to the carbon in the 3-position of the dihydrothiazine ring. In contrast, previous halo derivatives of cephalosporins, such as those described above, bear a halogen atom on a methylene group attached to the carbon atom in the 3-position of the dihydrothiazine ring. The novel compounds thus provided have a combination of features which comprise a 7-α-aminoacyl moiety attached to a cephalosporin nucleus which is substituted in the 3-position with a fluoro, chloro, bromo or iodo atom.

DETAILED DESCRIPTION

The 7-α-aminoacyl-3-halo cephalosporin compounds of the invention are represented by the following formula I

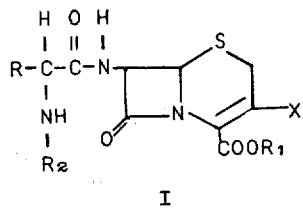

I wherein

R is phenyl, hydroxyphenyl, halophenyl, methylphenyl, methoxyphenyl, 2-thienyl, 3-thienyl or 2-furyl;

$R_1$ is hydrogen, benzyl, p-methoxybenzyl, p-nitrobenzyl, diphenylmethyl, 2,2,2-trichloroethyl, trimethylsilyl, or t-butyl;

$R_2$ is hydrogen,

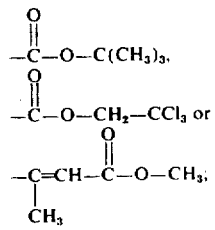

X is fluoro, chloro, bromo or iodo;

and when $R_1$ is hydrogen the pharmaceutically acceptable non-toxic salts thereof.

In the foregoing formula the term "hydroxyphenyl" refers to the mono and dihydroxyphenyl groups such as 4-hydroxyphenyl, 3-hydroxyphenyl, 2-hydroxyphenyl, 3,4-dihydroxyphenyl, and 2,4-dihydroxyphenyl. "Halophenyl" refers to the mono and di halo substituted phenyl groups wherein halo refers to fluoro, chloro and bromo, such as 4-fluorophenyl, 4-chlorophenyl, 3,4-dichlorophenyl, 3-chlorophenyl, 2-chlorophenyl, 3-bromophenyl, 4-bromophenyl, and the like. "Methylphenyl" refers to the mono and di methylated phenyl groups such as the isomeric 2, 3, and 4-methylphenyl groups and the dimethylphenyl groups such as 3,4-dimethylphenyl, and 2,4-dimethylphenyl. The term "methoxyphenyl" refers to the mono and di methoxylated phenyl groups such as 4-methoxyphenyl, 3-methoxyphenyl, 2-methoxyphenyl, 3,4-dimethoxyphenyl, and 2,6-dimethoxyphenyl.

The ester groups represented by $R_1$ in the above formula are all known ester moieties which are commonly employed in the cephalosporin art to protect the $C_4$ carboxyl group of the cephalosporin molecule while reactions involving other reactive sites in the molecule are carried out. The preparation of the esters of the formula I ($R_1$ = other than hydrogen) are carried out by following procedures by which the same ester groups are employed as $C_4$ carboxyl group protecting esters with other known cephalosporin compounds.

The term "pharmaceutically acceptable non-toxic salts" refers to both the salts of the $C_4$ carboxylic acid function and the acid addition salts of the α-amino group of the 7-glycylamido side chain. Pharmaceutically acceptable salts involving the $C_4$ carboxylic acid function include the salts formed with inorganic bases such as the sodium, potassium and calcium salts which can be prepared with sodium bicarbonate, potassium carbonate, calcium hydroxide, sodium hydroxide and like bases. Pharmaceutically acceptable amine salts can also be prepared for example with the organic amines such as dicyclohexylamine, benzylamine, 2-aminoethanol, diethanolamine, diisopropylamine, and like organic amines. Acid addition salts of the α-amino group include the salts formed with the mineral acids such as hydrochlorides, hydrobromides and the sulfates and the salts formed with organic sulfonic acids such as p-toluenesulfonate, and like salts.

It will be readily recognized that when $R_1$ is hydrogen the zwitterionic form of the compounds can exist which form arises via intramolecular salt formation.

Owing to the presence of the assymetric carbon atom in the α-aminoacyl group the 3-halo cephalosporins of the above formula include the D-, L- and DL- forms. The D- form is the preferred isomeric form of the present invention.

Examples of the α-aminoacyl-3-halo-cephalosporins represented by the above formula are the following:

7-(D-phenylglycylamido)-3-fluoro-3-cephem-4-carboxylic acid,
7-(D-phenylglycylamido)-3-chloro-3-cephem-4-carboxylic acid,
7-(D-phenylglycylamido)-3-bromo-3-cephem-4-carboxylic acid,
7-(D-phenylglycylamido)-3-iodo-3-cephem-4-carboxylic acid,
7-(D-4-hydroxyphenylglycylamido)-3-fluoro-3-cephem-4-carboxylic acid,
7-(D-3-hydroxyphenylglycylamido)-3-chloro-3-cephem-4-carboxylic acid,
7-[D-2-(2-thienyl)glycylamido]-3-chloro-3-cephem-4-carboxylic acid,
7-[D-2-(2-furyl)glycylamido]-3-chloro-3-cephem-4-carboxylic acid,
7-(D-4-chlorophenylglycylamido)-3-bromo-3-cephem-4-carboxylic acid,
7-(D-3-methylphenylglycylamido)-3-chloro-3-cephem-4-carboxylic acid,
7-(D-2,6-dimethoxyphenylglycylamido)-3-chloro-3-cephem-4-carboxylic acid,
7-[D-2-(3-thienyl)glycylamido]-3-fluoro-3-cephem-4-carboxylic acid,
7-[D-2-(3-thienyl)glycylamido]-3-chloro-3-cephem-4-carboxylic acid,
7-[D-2-(2-thienyl)glycylamido]-3-iodo-3-cephem-4-carboxylic acid, as the zwitterionic forms and the pharmaceutically acceptable salts thereof.

The compounds of the formula I wherein $R_1$ is hydrogen or the pharmaceutically acceptable non-toxic salts thereof are valuable antibiotics useful for combating infections in warm blooded mammals caused by gram-positive and gram-negative microorganisms. They are effective when administered parenterally, for example, subcutaneously or intramuscularly, as well as when administered orally.

The 7-α-aminoacyl 3-halo-cephalosporins possess a broad specturm of anti-bacterial activity as illustrated by the in vitro spectrum for 7-(D-phenylglycylamido)-3-chloro-3-cephem-4-carboxylic acid presented in the following tables.

Table I lists the minimum inhibitory concentrations (MIC) in micrograms per milliliter (μg./ml.) obtained with this compound in the standard agar dilution test.

Table I 7-(D-Phenylglycylamido)-3-chloro-3-cephem-4-carboxylic acid in vitro spectrum

| Organism* | MIC (μg./ml.) |
|---|---|
| Staphylococcus aureus 3055 | 1 |
| Staphylococcus aureus 3074 | 1 |
| Streptococcus faecalis X66 | 16 |
| Proteus morganii PR15 | >128 |
| Salmonella typhosa SA12 | <.5 |
| Klebsiella pneumoniae KL14 | 2 |
| Enterobacter aerogenes EB17 | 8 |
| Serratia marcescens SE3 | 8 |
| Escherichia coli EC14 | |

Table I-continued 7-(D-Phenylglycylamido)-3-chloro-3-cephem-4-carboxylic acid in vitro spectrum

| Organism* | MIC (μg./ml.) |
|---|---|
| Citrobacter freundii CF17 | >128 |
| Pseudomonas aeruginosa X239 | >128 |
| Bordetella bronchiseptica 16 | 64 |
| Salmonella typhimurium | 1 |
| Pseudomonas solanacearum X185 | >128 |
| Erwinia amylovora | 1 |

*Numbers and/or letters following the organism name refer to strains.

Table II below lists the diameter in millimeters of the zone of inhibition of growth of the indicated microorganisms in the standard disc-plate assay obtained with 7-(D-phenylglycylamido)-3-chloro-3-cephem-4-carboxylic acid.

Table II

| Microorganism | Zone of inhibition* (mm-diameter) Concentration (mg/ml) | | |
|---|---|---|---|
| | 1.0 | 0.1 | 0.01 |
| Staphylococcus aureus | 35 | 28 | 20 |
| Bacillus subtilis | 44 | 32 | 21 |
| Sarcina lutea | 48 | 27 | 27 |
| Mycobacterium avium | 24 | Tr | — |
| Proteus vulgaris | 23 | Tr | — |
| Salmonella gallinarum | 35 | 25 | 13 |
| Escherichia coli | 30 | 20 | 11 |
| Klebsiella pneumoniae | 28 | 20 | 12 |
| Pseudomonas solanacearum | 32 | 23 | — |

*Tr indicates a trace zone.
A dash (—) indicates no observed zone.

In Table III which follows the MIC values obtained with 7-(D-phenylglycylamido)-3-chloro-3-cephem-4-carboxylic acid against a spectrum of gram-positive and gram-negative microorganisms in the agar dilution test is shown.

Table III

In vitro Antibiotic Spectrum of 7-(D-phenylglylcylamido)-3-chloro-3-cephem-4-carboxylic acid

| Test Organism* | | Minimum Inhibitory Concentration MIC μg./ml. |
|---|---|---|
| Staphylococcus aureus | 3055 | 1.0 |
| " | 3123 | 1.0 |
| " | 3074 | 2.0 |
| Streptococcus (Group D) | 9901 | 64 |
| Enterobacter cloacae | EB9 | >128 |
| Enterobacter aerogenes | EB17 | 64 |
| Escherichia coli | EC14 | 1.0 |
| " | EC35 | 2.0 |
| " | EC38 | 1.0 |
| Klebsiella sp. | KL3 | <0.5 |
| " | KL14 | 2.0 |
| " | KL25 | 2.0 |
| Proteus mirabilis | PR6 | 1.0 |
| Proteus morganii | PR1 | 128 |
| Proteus rettgeri | PR9 | >128 |
| " | PR2 | >128 |
| Salmonella | SA12 | <0.5 |
| Shigella sp. | SH3 | 2.0 |

*Numbers and/or letters following the organism name refer to strains.

In the standard agar dilution test, 7-(D-phenylglycylamido)-3-chloro-3-cephem-4-carboxylic acid demonstrated activity against Hemophilus influenzae having MIC values of from 1 to 4 mcg./ml. against a number of strains.

In Table IV which follows the oral absorption of 7-(D-phenylglycylamido)-3-chloro-3-cephem-4-carboxylic acid is demonstrated by the blood and urine levels obtained in mice. In carrying out the test McAllister Swiss mice weighing from 11 to 13 grams were fasted overnight and were then orally administered 20 mg./kg. of 7-(D-phenylglycylamido)-3-chloro-3-cephem-4-carboxylic acid. Blood and urine samples were taken at the indicated intervals and the concentration of the antibiotic in each sample was determined by microbiological assay using *Sarcina lutea* in pH 6.0 agar in the disc-plate assay.

Table IV 7-(D-Phenylglycylamido)-3-chloro-3-cephem-4-carboxylic acid Blood and Urine Levels

| Mouse No. | Concentration μg./ml. at time intervals (min.) | | | | | | |
|---|---|---|---|---|---|---|---|
| | 5 | 15 | 30 | 60 | 90 | 120 | 240 |
| 1 | 29.1 | 16.2 | 11.6 | 3.5 | 1.2 | 0.5 | 0.2 |
| 2 | 23.7 | 19.2 | 11.0 | 5.2 | 3.2 | 2.0 | 0.6 |
| 3 | 17.6 | 10.1 | 9.1 | 5.7 | 2.1 | 1.3 | 0.7 |
| 4 | 23.3 | 13.6 | 10.1 | 4.0 | 1.6 | 1.6 | 1.0 |
| Avg. Blood | 23.4 | 14.8 | 10.5 | 4.6 | 2.0 | 1.4 | 0.6 |
| Avg. in Pooled urine | — | 1474 | 1764 | 843 | 305 | 308 | 226 |

The effective dose ($ED_{50}$) for 7-(D-phenylglycylamido)-3-chloro-3-cephem-4-carboxylic acid which is illustrative of the effective dose for the compounds of the invention is 0.74 mg./kg. × 2 orally and 0.48 mg./kg. × 2 s.c. vs. *Streptococcus pyogenes*; 5.5 mg./kg. × 2 orally vs. *Escherichia coli* and 17.6 mg./kg. × 2 orally vs. *Diplococcus pneumoniae* as determined in mice.

In Table V, below, are presented the minimum inhibitory concentrations (MIC) against representative gram-negative bacteria for illustrative 3-halo-3-cephem compounds of the invention. The inhibitory concentrations were determined by the Gradient-Plate method carried out essentially as described by Bryson and Szybalski, Science, 116, 45 (1952). In Table V the R terms have reference to the structural formula.

TABLE V

Antibiotic Activity of Substituted 7-(Phenylglycylamido)-3-chloro-3-cephem-4-carboxylic acids vs. Gram-Negative Bacteria

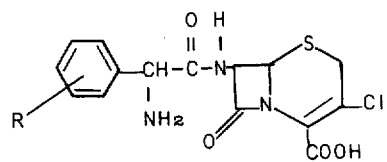

| Test Organism | Minimum Inhibitory Concentration (μg/ml) | | | |
|---|---|---|---|---|
| | R 3—OH | 4—OH | 4—Cl | H |
| *Shigella* sp. | 1.0 | 2.0 | 13.3 | 6.7 |
| *Escherichia coli* | 1.0 | 2.0 | 17.2 | 5.7 |
| *Klebsiella pneumoniae* | 0.9 | 1.5 | 8.0 | 0.9 |
| *Aerobacter aerogenes* | 0.8 | 1.0 | 5.0 | 0.8 |
| *Salmonella heidelberg* | 0.5 | 0.8 | 10.7 | 0.2 |
| *Pseudomonas aeruginosa* | >200 | >200 | >200 | >200 |
| *Serratia marcescens* | 180 | 120 | 180 | >200 |

In the following Table VI, the activity of representative 3-halo-3-cephem compounds against several clinical isolates of penicillin-resistant staphylococci is presented. The activity is presented in minimum inhibitory concentrations of the test compound. The minimum concentrations were determined by the Gradient-Plate method.

TABLE VI

Antibiotic Activity of Substituted 7-(Phenylglycylamido)-3-chloro-3-cephem-4-carboxylic acids vs. Penicillin Resistant Staphylococcus

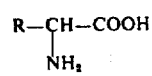

| Staphylococcus Strain[1] | Minimum Inhibitory Concentration (μg/ml)[2] | | | |
|---|---|---|---|---|
| | R 3—OH | 4—OH | 4—Cl | H |
| V41 | 3.0/ | 5.0/ | 10.5/>20 | 11.5/>20 |
| V32 | 3.5/ | 7.0/ | 18/>20 | 17/>20 |
| X400 | >20/ | >20/ | >20/>20 | >20/>20 |
| V-84 | 0.5/ | 0.6/ | 3.0/>20 | 2.7/15 |
| X1.1 | 0.4/ | 0.6/ | 0.4/0.7 | 0.4/1.0 |

[1]The letter-numberal designations refer to strains of clinical isolates of penicillin resistant Staphylococcus.
[2]In the columns, the value above the slash is the MIC in the absence of human serum. The value below the slash, when present, is the MIC in the presence of human serum.

The compounds of the invention are prepared by the N-acylation of a 7-amino-3-halo-3-cephem-4-carboxylic acid or an ester thereof, for example the benzyl, p-methoxybenzyl, p-nitrobenzyl, diphenylmethyl, 2,2,2-trichloroethyl, trimethylsilyl or t-butyl ester, with an active derivative of a phenyl, thienyl or furyl substituted glycine of the formula

R—CH—COOH
         |
        NH₂ wherein R has the same meanings as defined in Formula I. In carrying out the acylation the amino group of the glycine is desirably protected as for example as salt such as the hydrochloride or with one of the commonly used amino-protecting groups as for example the t-butyloxycarbonyl, benzyloxycarbonyl, p-nitrobenzyloxycarbonyl, trichloroethyoxycarbonyl, or trityl group, or enamines formed with methyl acetoacetate and acetylacetone and like groups. Activated derivatives of the carboxyl group of the substituted glycine can be the acid halides such as the acid chlorides, the activated esters such as those formed with pentachlorophenol, the azide, or the mixed anhydride formed with the glycine and methyl chloroformate and isobutyl chloroformate. Also, the amino-protected glycine can be used directly in the acylation of the desired 3-halo nucleus ester by employing a condensing agent such as N-ethoxycarbonyl-2-ethoxy-1,2-dihydroquinoline (EEDQ). For example, p-nitrobenzyl 7-amino-3-chloro-3-cephem-4-carboxylate is reacted with N-(t-butyloxycarbonyl)-D-phenylglycine in a dry inert solvent, for example, tetrahydrofuran, to form p-nitrobenzyl 7-(D-phenylglycylamido)-3-chloro-3-cephem-4-carboxylate. In general, any of the known amide coupling methods can be used in the acylation of the 7-amino-3-halo-3-cephem-4-carboxylic acids or esters. When the activated derivative is an acid halide the acylation is carried out in the presence of a hydrogen halide acceptor such as sodium bicarbonate, pyridine, sodium bisulfite, or an alkylene oxide such as propylene oxide. When a mixed anhydride is used in the acylation the mixed anhydride may be formed with the use of N-ethoxycarbonyl-2-ethoxy-1,2-dihydroquinoline (EEDQ). When an N-protected phenyl, thienyl or furylglycine is used, the acylation can be carried out in the presence of a condensing agent such as N,N'-dicyclohexylcarbodiimide.

Illustrative of the substituted glycines which can be used in the preparation of the compounds of the invention are D-phenylglycyl chloride hydrochloride, D-4-hydroxyphenylglycyl chloride hydrochloride, pentachlorophenyl D-phenyl-N-(t-butyloxycarbonyl)glycinate, pentachlorophenyl D-2-thienyl-N-(2,2,2-trichloroethoxycarbonyl)-glycinate, N-(t-butyloxycarbonyl)-D-phenylglycine, N-(1-carbomethoxy-2-propenyl)-D-phenylglycine, 3-thienylglycyl chloride hydrochloride, N-(t-butyloxycarbonyl)-2-thienylglycine and N-(t-butyloxycarbonyl)-2-furylglycine.

The acylation is carried out in an inert solvent for example in acetone, acetonitrile, dimethylformamide or methylene chloride and preferably at a temperature between about −20° and 20°C. For example, 7-(D-phenylglycylamido)-3-chloro-3-cephem-4-carboxylic acid is prepared by reacting D-phenylglycyl chloride hydrochloride with p-nitrobenzyl 7-amino-3-chloro-3-cephem-4-carboxylate in acetonitrile in the presence of propylene oxide. The ester group is then removed by hydrogenolysis.

Illustrative of the 7-amino-3-halo-3-cephem-4-carboxylic acids and esters which are starting materials in the preparation of compounds of formula I are 7-amino-3-chloro-3-cephem-4-carboxylic acid, 7-amino-3-fluoro-3-cephem-4-carboxylic acid, p-nitrobenzyl 7-amino-3-chloro-3-cephem-4-carboxylate, diphenylmethyl 7-amino-3-bromo-3-cephem-4-carboxylate, 7-amino-3-iodo-3-cephem-4-carboxylic acid, diphenylmethyl 7-amino-3-chloro-3-cephem-4-carboxylate and p-methoxybenzyl 7-amino-3-fluoro-3-cephem-4-carboxylate.

The 7-amino-3-halo-3-cephem-4-carboxylic acids and esters are prepared in the following manner. A 7-acylamido cephalosporanic acid or an ester thereof is converted to a 7-acylamido-3-exomethylenecepham-4-carboxylic acid or ester according to the method described in my co-pending application Ser. No. 118,941, filed Feb. 25, 1971. An ester of the 3-exomethylenecepham compound is then oxidized with ozone to form an intermediate ozonide involving the 3-exomethylene grouping, which ozonide on decomposition provides the 7-acylamido-3-hydroxy-3-cephem-4-carboxylic acid ester. The ozonolysis of a 3-exomethylenecepham compound to provide a 3-hydroxy-3-cephem-4-carboxylic acid ester is carried out according to the methods and procedures described in my co-pending application Ser. No. 310,191, filed Nov. 28, 1972. The 3-hydroxy-3-cephem ester is then fluorinated, chlorinated, brominated or iodinated according to the procedures described in my co-pending application Ser. No. 335,414, filed Feb. 23, 1973 now abandoned, and co-pending application Ser. No. 457,150, filed this even date, to provide the corresponding 3-halo-3-cephem. The 7-acyl group of the 3-halo cephem is then removed by the well-known side chain cleavage reaction by employing phosphorus pentachloride in pyridine to obtain the imino chloride derivative of the side chain, the imino chloride is then reacted with an alcohol such as methanol to provide the imino ether, the imino ether is then readily hydrolyzed to provide the 7-amino-3-halo-3-cephem-4-carboxylic acid ester. For example, a 7-acylamidocephalosporanic acid such as 7-phenoxyacetamidocephalosporanic acid is reacted with a sulfur-containing nucleophile according to known procedures to effect a nucleophilic displacement of the acetoxy group of the cephalosporanic acid and provide a 7-acylamido-3-thio-substituted-methyl-3-cephem-4-carboxylic acid. The 3-thio-substituted-cephem acid is then reduced with zinc/formic acid in the presence of dimethylformamide (DMF) or with Raney nickel in the presence of hydrogen to yield a 7-acylamido-3-exomethylenecepham-4-carboxylic acid. For example, 7-phenoxyacetamido-3-acetoxymethyl-3-cephem-4-carboxylic acid is reacted with potassium ethyl xanthate to provide 7-phenoxyacetamido-3-ethoxythionocarbonylthiomethyl-3-cephem-4-carboxylic acid. Reduction of the latter compound with zinc and formic acid in the presence of DMF provides 7-phenoxyacetamido-3-exomethylenecepham- 4-carboxylic acid. Likewise, any of a wide variety of 7-acylamidocephalosporanic acids can be reacted with a variety of sulfur-containing nucleophiles to provide the 3-thio-substituted-methyl-3-cephem compounds. For example the 7-acylamido group can be a heterocyclic containing chain for example 2-thienylacetamido, 2-furylacetamido, and the like, or it can be an alkanoyl side chain as exemplified by acetamido or a wide variety of other side chains as disclosed in my copending application. Also, the sulfur-containing nucleophile can be any of a wide variety of compounds such as thiourea and substituted thioureas which react with the cephalosporanic acids to provide isothiouronium salts, the thiobenzoates, mercaptopyridine N-oxide, 1-methyl-tetrazol-5-thiol, 5-methyl-1,3,4-thiadiazol-2-thiol, and like sulfur-containing nucleophiles. Following the reductive displacement reaction described above the 3-exomethylenecepham-4-carboxylic acid thus prepared is then esterified for example with p-nitrobenzyl bromide, p-methoxybenzyl bromide, diphenyldiazomethane, or 2,2,2-trichloroethyl chloroformate or other ester forming compounds, and the 3-exomethylenecepham ester is reacted with ozone to provide the 3-hydroxy-3-cephem ester. The ozonolysis reaction of a 3-exomethylenecepham ester is carried out in an inert solvent at a temperature between about −80° and 0°C. and preferably between −80° and −50°C. to form an intermediate ozonide. The ozonide is then decomposed, in situ, in the cold to provide the corresponding 3-hydroxy-3-cephem ester as illustrated in the following reaction scheme.

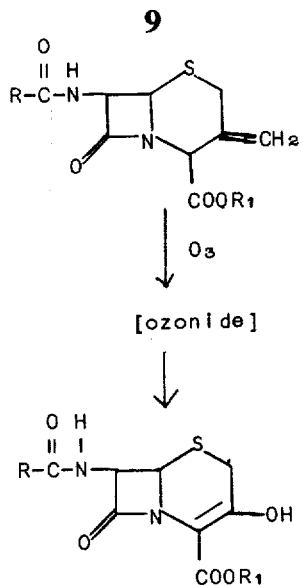

In the above formula R is H or the residue of the acylamido group as described above for example R can be benzyl, phenoxymethyl, methyl, 2-thienylmethyl, 2-furylmethyl, and the like and $R_1$ is as defined in the formula I.

The ozonolysis of a 3-exomethylenecepham ester is carried out by bubbling ozone into a solution of the ester in an inert solvent until ozonide formation is complete. Inert solvents which can be used in the ozonolysis method are those solvents in which the 3-exomethylenecepham esters are at least partially soluble and which are unreactive with ozone under the described conditions. Commonly used solvents such as methanol, ethanol, ethyl acetate, methyl acetate, iso-amyl acetate, and methylene chloride are satisfactory solvents.

Ozone gas is prepared by means of an ozone generator of the type commonly used in synthetic and analytical chemical work. Such generators produce ozone by the action of an electric discharge on oxygen. One such ozone generator is that manufactured by the Wellsback Corporation. The ozone if generated in a stream of oxygen which is then passed directly into the reaction vessel. The percentage of ozone contained in the oxygen stream can be varied as described, for example, by varying the rate of flow of oxygen through the ozonizer as well as by varying the intensity of the electric discharge.

The concentration of the 3-exomethylenecepham ester starting material in the inert solvent is not critical and it is preferred to use a solvent volume sufficient to form a complete solution.

When ozonide formation is complete, any excess ozone present in the reaction mixture is purged from the mixture by bubbling nitrogen, oxygen or an inert gas such as argon through the mixture. Following the removal of any excess ozone, the ozonide is decomposed by adding to the reaction mixture a reducing agent selected from the group consisting of sodium bisulfite, sulfur dioxide, and trimethylphosphite to provide the 3-hydroxy-3-cephem-4-carboxylic acid ester. The decomposition is carried out by adding an excess of the decomposition reagent and then stirring the reaction mixture until the reaction mixture is negative to the potassium iodide-starch test. A preferred reagent for decomposing the intermediate ozonide is gaseous sulfur dioxide.

The 3-hydroxy-3-cephem esters are recovered from the reaction mixture by evaporating off the volatile solvents from the mixture to obtain the reaction product mixture as a residue and thereafter recrystallizing the reaction product from the residue.

The 7-acylamido-3-hydroxy-3-cephem-4-carboxylic acid esters thus prepared are than halogenated to provide the 7-acylamido-3-halo-3-cephem-4-carboxylic acid ester.

The 3-hydroxy group of the 7-acylamido-3-hydroxy-3-cephem ester is replaced with a chloro or bromo atom by reacting the ester in the presence of DMF with a reactive chloro or bromo compound. Chlorinating reagents which can be used in the chlorination include phosgene, oxalyl chloride, thionyl chloride, and the phosphorus chlorides, for example, phosphorus trichloride and phosphorus oxychloride. Brominating reagents which can be employed for the replacement of the 3-hydroxy group with bromine include carbonyl dibromide, oxalyl bromide, thionyl bromide (sulfurous oxybromide), and the phosphorus bromides, phosphorus oxybromide and phorphorus tribromide.

The chlorination and bromination is carried out by adding the halogenating reagent to a solution of the 3-hydroxy-3-cephem ester in dry DMF at a temperature of about 5° to 15°C. and allowing the reaction mixture to stand at room temperature for between 4 and 8 hours or longer. The reaction is initially exothermic and accordingly the reaction vessel is initially cooled in an ice-water bath and then maintained about 25°C. during the remainder of the reaction. The DMF is preferably dried prior to use over a molecular sieve. Although the reaction can be carried out in DMF as the solvent, a cosolvent may also be employed along with the DMF. For example, a cosolvent such as tetrahydrofuran, dioxane, methylene chloride, dimethylacetamide or dimethylsulfoxide can be used along with DMF.

The 3-chloro or 3-bromo-3-cephem esters are recovered from the reaction product mixture by pouring the mixture into a water-ethyl acetate mixture and separating the organic phase containing the product. The organic phase is washed, dried and is then evaporated to provide the 3-halo-3-cephem ester as an amorphous residue. The product is obtained crystalline in many instances by trituration of the residue with ether or with n-hexane.

The fluorination of a 3-hydroxy-3-cephem ester is carried out by reacting a 7-acylamido-3-hydroxy-3-cephem ester in an inert solvent with the fluorinated tertiary amine, N-(2-chloro-1,1,2-trifluoroethyl)diethylamine. The fluorinated tertiary amine is prepared by reacting diethylamine with chlorotrifluoroethylene as described in *J. Org. Chem.* 29, 2187 (1964); *Tetrahedron Lett.* 23, 1065 (1962) and *Tetrahedron Lett.* 26, 1249 (1962). An equivalent amount of the fluorinated tertiary amine is employed in an inert solvent, for example methylene chloride, chloroform, tetrahydrofuran, or any unreactive solvent in which the starting material and fluorinating reagent are substantially soluble. The reaction mixture containing the 3-hydroxy ester and the fluorinating reagent is heated in the inert solvent at a temperature between about 30+ and about 60°C. for about 1 hour. The fluoro cephem ester is recovered by following recovery procedures analogous to those described for the recovery of the 3-chloro and 3-bromo compounds.

Alternatively, the 3-fluoro-3-cephem compounds of this invention can be prepared by reacting a 3-alkyl- or 3-arylsulfonyloxy-3-cephem-4-carboxylic acid ester with an inorganic fluoride such as sodium or potassium fluoride in the presence of an 18-crown-6 ether and an inert solvent at between about −20° and 25°C. For example, p-nitrobenzyl 7-[2-(2-thienyl)-acetamido]-3-hydroxy-3-cephem-4-carboxylate is esterified in dry, N,N-dimethylacetamide in the presence of propylene oxide with an equivalent amount of methanesulfonyl chloride at room temperature. The esterified product, p-nitrobenzyl 7-[2-(2-thienyl)acetamido]-3-methylsulfonyloxy-3-cephem-4-carboxylate is then reacted with dicyclohexyl-18-crown-6 ether and potassium fluoride in dry acetonitrile to provide the corresponding 3-fluoro ester by displacement of the 3-methylsulfonyloxy group. The thiophene-2-acetyl side chain is then removed by the $PCl_5$ side-chain cleavage method to provide p-nitrobenzyl 7-amino-3-fluoro-3-cephem-4-carboxylate nucleus. The nucleus ester is then acylated in tetrahydrofuran with N-(t-butyloxycarbonyl)D-α-phenylglycine in the presence of the condensing agent, N-ethoxycarbonyl-2-ethoxy-1,2-dihydroquinoline (EEDQ) to provide p-nitrobenzyl 7-[D-2-(t-butyloxycarbamido)-2-phenylacetamido]-3-fluoro-3-cephem-4-carboxylate. The t-butyloxycarbonyl protecting group is removed with p-toluene-sulfonic acid in acetonitrile according to the method described by U.S. Pat. No. 3,769,281, and the p-nitrobenzyl ester group is removed by hydrogenolysis on 5 percent Pd/c to provide the compound of the invention, 7-(D-phenylglycylamido)-3-fluoro-3-cephem-4-carboxylic acid.

As indicated above, the starting materials in this preparation of the 3-fluoro compounds are prepared from the corresponding 3-hydroxy-3-cephem compounds. In this method a 7-acylamido-3-hydroxy-3-cephem-4-carboxylic acid ester is reacted in an inert solvent with a lower alkylsulfonyl halide or a phenyl or substituted phenylsulfonyl halide in the presence of a hydrogen halide acceptor to form the corresponding 3-lower alkylsulfonyloxy, 3-phenylsulfonyloxy, or substituted 3-phenylsulfonyloxy derivative of the 3-hydroxy substituent.

The preparation of the alkylsulfonate and arylsulfonate estrs of the 3-hydroxy-3-cephem esters is carried out as described in co-pending application Ser. No. 439,207, filed Feb. 6, 1973, and is illustrated by the following general reaction scheme.

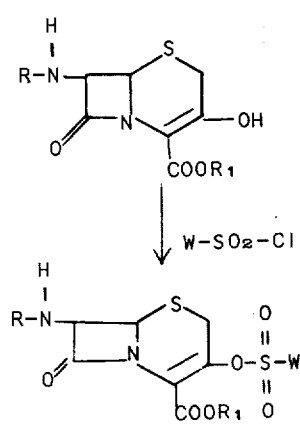

In the above formulae, R is an acyl group derived from a carboxylic acid, for example, acetyl, 2-thiopheneacetyl, phenylacetyl, phenoxyacetyl and $R_1$ is as defined hereinbefore. W is $C_1$-$C_6$ lower alkyl, such as methyl, ethyl, propyl, n-butyl, n-hexyl, and the like, or W is a phenyl group or a substituted phenyl group such as methylphenyl, nitrophenyl, or halophenyl. Representative of the sulfonyl halides which can be employed in the preparation of these sulfonate esters are methanesulfonyl chloride, toluenesulfonyl chloride, p-fluorobenzene sulfonyl chloride, ethanesulfonyl chloride, butanesulfonyl chloride, and the like.

The reaction is carried out in an inert solvent at a temperature between about −5° and 35°C., and preferably between about 15° and 25°C. Inert solvents which can be employed in the sulfonation reaction are solvents which are unreactive with the sulfonyl halide generally aprotic solvents. Solvents which can be employed include amides such as N,N-dimethylformamide and N,N-dimethylacetamide, and ethers such as tetrahydrofuran and dioxane. A preferred solvent for the sulfonation reaction is N,N-dimethylacetamide. The reaction is carried out in the presence of a hydrogen halide acceptor, for example, any of the commonly employed tertiary amines, such as pyridine and triethylamine; alkylene oxides also can be employed, with the most preferred hydrogen halide acceptor being propylene oxide. The tertiary amine hydrogen halide acceptors are less desirable than the alkylene oxides since the double bond in the $\Delta^3$ position of the cephem ring is susceptible to isomerization to the $\Delta^2$ position in the presence of these amines. However, should isomerization to the $\Delta^2$ isomer occur during sulfonate ester formation, the double bond can be isomerized back to the $\Delta^3$ position by oxidizing the $\Delta^2$ isomer of the sulfonate ester to the sulfoxide with a peracid, such as m-chloroperbenzoic acid or peracetic acid. During sulfoxide formation the double bond shifts from the $\Delta^2$ to the $\Delta^3$ position. The sulfoxide then can be reduced in accordance with well known methods, for example, with phosphorus trichloride, to provide the 3-cephem sulfonate ester.

A preferred sulfonate ester for the conversion of the 3-hydroxy-3-cephem-4-carboxylic acid esters to the corresponding 3-fluoro-3-cephem compounds is the methylsulfonate ester (mesylate). Another preferred ester is that formed with p-toluenesulfonyl chloride (tosylate ester). A preferred $C_4$ carboxylic acid protecting ester group in the above described process is the p-nitrobenzyl ester.

In accordance with this method, the alkyl sulfonate or arylsulfonate esters of a 3-hydroxy-3-cephem ester can be converted to the corresponding 3-fluoro-3-cephem ester by the following general reaction scheme.

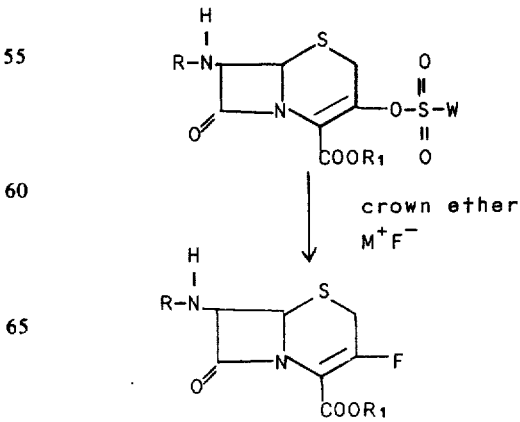

As indicated hereinabove, the sulfonate ester starting materials are defined as having in the 3-position the substituent

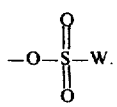

The substituent W, as used herein, defines $C_1$–$C_6$ lower alkyl, phenyl, tolyl, halophenyl, or nitrophenyl. Preferably, W is methyl, phenyl, or P-tolyl. Typical of the sulfonate ester groups therby defined are methylsulfonyloxy, ethylsulfonyloxy, n-propylsulfonyloxy, isopropylsulfonyloxy, n-butylsulfonyloxy, isobutylsulfonyloxy, t-butylsulfonyloxy, n-amylsulfonyloxy, isoamylsulfonyloxy, t-amylsulfonyloxy, n-hexylsulfonyloxy, isohexylsulfonyloxy, 2,2-dimethylbutylsulfonyloxy, 3,3-dimethylbutylsulfonyloxy, 2,3-dimethylbutylsulfonyloxy, 3-methylpentylsulfonyloxy, phenylsulfonyloxy, p-tolylsulfonyloxy, m-tolylsulfonyloxy, o-tolylsulfonyloxy, o-nitrophenylsulfonyloxy, m-nitrophenylsulfonyloxy, p-nitrophenylsulfonyloxy, p-chlorophenylsulfonyloxy, m-bromophenylsulfonyloxy, p-fluorphenylsulfonyloxy, o-chlorophenylsulfonyloxy, p-bromophenylsulfonyloxy, and the like.

The fluorination of the 3-sulfonate esters is carried with an inorganic fluoride in the presence of a crown ether as described in co-pending application Ser. No. 439,206, filed Feb. 6, 1974.

Crown ethers are recognized in the literature, see for example, R.N. Greene, *Tetrahedron Letters*, No. 18 (1972) pp. 1793–1796. Crown ethers are cyclic structures comprised of a chain of alternating ethylene groups and oxygen atoms. In the process of this invention, an 18-crown-6 ether is employed. The basic unsubstituted 18-crown-6 ether structure is

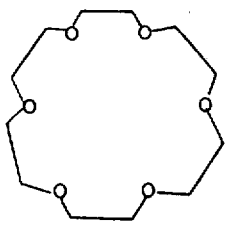

Alternatively, it is named 1,4,7,10,13,16-hexaoxacyclooctadecane. The common designation "18-crown-6" defines the total number of atoms in the ring (18) and the total number of oxygens (6) in the ring. Other 18-crown-6 ethers can be employed in the process of this invention. These include, for example, dibenzo-18-crown-6 having the formula

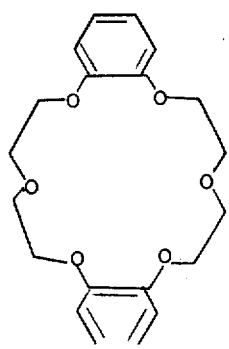

and dicyclohexyl-18-crown-6 having the formula

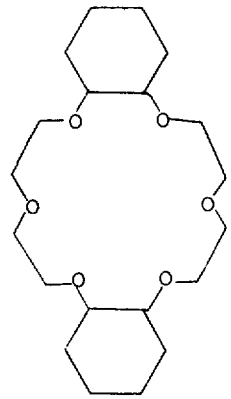

The source of fluorine for use in displacement of the sulfonate ester function is an inorganic fluoride of the formula $M^+F^-$ in which $M^+$ refers to a sodium, potassium or silver ion. Preferably, the fluoride salt which is employed is potassium fluoride.

The conversion of the 3-sulfonyloxy-3-cephem to the 3-fluoro-3-cephem is carried out in an inert solvent, specifically a nitrile or a nitroalkane, preferably acetonitrile, propionitrile, nitromethane, or nitroethane, and, most preferably, acetonitrile, under substantially anhydrous conditions at a temperature of from about $-20°$ to about $+25°C.$, and, preferably, from about $+15°$, to about $+25°C$. The 3-sulfonate ester cephalosporin present in the selected solvent is mixed with preferably, a maximum of one equivalent of the inorganic fluoride salt based on the sulfonate ester. Preferably, an equivalent amount of the sulfonate ester and the fluoride salt are employed. The crown ether preferably should be present in the reaction mixture in an amount equivalent on a molar basis to the amount of fluoride salt which is present. An excess of the crown ether can be employed; however, the excess will serve no useful purpose and will constitute simply a waste of valuable reagent. The reaction mixture is maintained at reaction temperature for a period of generally of from about 30 minutes to about 3 hours, total time generally being dependent upon the temperature of reaction.

The product which is obtained from the reaction will correspond structurally in every respect to the sulfonate ester starting material with the exception that the group $—O—SO_2—W$ will have been displaced by a fluorine atom.

As mentioned hereinbefore, the initial 3-sulfonate ester cephalosporin reactant can be either a $\Delta^3$-cephalosporin, a $\Delta^2$-cephalosporin, or a mixture of the two. The active reactant is the $\Delta^3$-cephalosporin. However, under the conditions of reaction, any $\Delta^2$-cephalosporin which may be present is isomerized to the corresponding $\Delta^3$-cephalosporin, and thus the active reactant is formed in situ from any $\Delta^2$-cephalosporin which may be present initially in the reaction mixture.

The iodination of a 7-acylamido-3-hydroxy-3-cephem-4-carboxylic acid ester is carried out by reacting the ester in DMF with a diiodo triaryl phosphite, for example, iodotriphenylphosphonium iodide or a triaryl phosphate methiodide for example triphenyl phosphate methiodide, respectively represented by the formulae

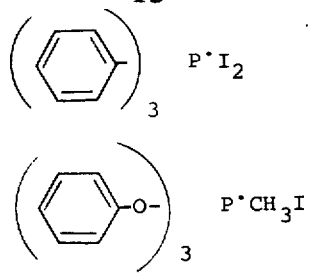

The iodination is carried out in dry DMF at a temperature between about 20° and 35°C. by employing a molar excess of the iodinating reagent. The 3-hydroxy-3-cephem ester and the iodinating reagent are allowed to react for about 12 to about 15 hours and thereafter the reaction mixture is poured into a mixture of ethyl acetate and water. The organic layer is separated and is washed with a 5% solution of sodium thiosulfate to remove any free iodine present. Following a water wash the organic phase is dried and is evaporated. The reaction product mixture obtained as a residue is triturated with ether or with a hydrocarbon solvent such as n-hexane to obtain the 7-acylamido-3-iodo-3-cephem-4-carboxylic acid ester.

The iodinating reagents described above are known reagents which have previously been employed for converting hydroxylic compounds to iodo compounds, for example, as described in *J. Am. Chem. Soc.* 86, 2093 (1964), *J. Chem. Soc.* (1953) 2224 and *J. Chem. Soc.* (1954) 2281.

Following the preparation of the 7-acylamido-3halo-3-cephem-4-carboxylic acid esters as described above the respective 7-amino-3-halo-3-cephem-4-carboxylic acid esters are obtained by carrying out the well-known N-deacylation of the 7-acylamido side chain. For example the 7-acylamido-3-halo cephalosporin ester is reacted with phosphorus pentachloride in methylene chloride in the presence of pyridine to form the intermediate imino chloride. The imino chloride is then reacted with an alcoholic solvent such as methanol or isobutanol to provide the corresponding imino ether. The imino ether is then hydrolyzed to provide the 7-amino-3-halo-3-cephem-4-carboxylic acid ester as a hydrochloride salt.

As previously mentioned the 7-amino-3-halo starting material can be acylated either as the feee acid or as an ester thereof. The acylation of the 7-amino-3-halo nuclei is carried out as previously described.

In a specific embodiment of the preparation of starting materials and the compounds of the invention, 7-phenoxyacetamidocephalosporanic acid is reacted with thiourea to provide the isothiouronium salt by the displacement of the acetoxy group in the 3-position of the cephalosporanic acid dihydrothiazine ring. The isothiouronium salt is then reacted with zinc and excess 90% formic acid in the presence of dimethylformamide at a temperature of about 25° to provide the 7-phenoxyacetamido-3-exomethylenecepham-4-carboxylic acid.

The 3-exomethylenecepham carboxylic acid is esterified with p-nitrobenzyl bromide in the presence of a hydrogen halide acceptor to provide the 3-exomethylenecepham-4-carboxylic acid p-nitrobenzyl ester. The 3-exomethylenecepham ester is then ozonized in methylene chloride at a temperature of about −70° and the ozonolysis mixture is treated with sulfur dioxide to decompose the intermediate ozonide to yield p-nitrobenzyl 7-phenoxyacetamido-3-hydroxy-3-cephem-4-carboxylate. The 3-hydroxy ester is then reacted with phosphorus trichloride in dry DMF to provide p-nitrobenzyl 7-phenoxyacetamido-3-chloro-3-cephem-4-carboxylate. The 3-chloro ester is then reacted in methylene chloride with phosphorus pentachloride in the presence of pyridine to provide, in situ, the imino chloride intermediate, which is then reacted with methanol to provide the corresponding imino ether intermediate. Upon addition of water to the reaction mixture the imino ether decomposes to provide the p-nitrobenzyl 7-amino-3-chloro-3-cephem-4-carboxylate. The 7-amino-3-chloro-3-cephem-4-carboxylic acid ester can then be acylated, as previously described herein, with D-phenylglycyl chloride hydrochloride or with an amino-protected D-phenylglycine derivative to provide the 7-(D-phenylgylcylamido)-3-chloro-3-cephem-4-carboxylic acid p-nitrobenzyl ester or an N-protected derivative thereof. After removal of the α-amino protecting group and the $C_4$ carboxyl ester group, 7-(D-phenylgylcylamido)-3-chloro-3-cephem-4-carboxylic acid is obtained. It will be recognized from the foregoing description of the preparation of the starting materials that a wide variety of known 7-acylamidocephalosporanic acids can be employed in the preparation of the 7-amino-3-halo-3-cephem-4 -carboxylic acids described herein.

A preferred compound of this invention is represented by the formula I wherein X represents chloro, $R_1$ being hydrogen, and R being phenyl and the pharmaceutically acceptable, nontoxic salts thereof. For example the compound 7-(D-α-phenylglycylamido)-3-chloro-3-cephem-4-carboxylic acid.

A further preferred group of compounds of the present invention are those represented by the formula I wherein R is hydroxyphenyl, $R_1$ is hydrogen and X is chloro and the pharmaceutically acceptable, non-toxic salts thereof. Illustrative of the this preferred group of compounds are 7-(D-α-4-hydroxyphenylglycylamido)-3-chloro-3-cephem-4-carboxylic acid, and 7-(D-α-3-hydroxyphenylglycylamido)-3-chloro-3-cephem-4-carboxylic acid.

An especially preferred antibiotic of this invention is 7-(D-phenylglycylamido)-3-chloro-3-cephem-4-carboxylic acid.

The following examples are provided to further illustrate the present invention and are not intended to be limiting thereof.

EXAMPLE 1

P-Nitrobenzyl 7-amino-3-methylenecepham-4-carboxylate hydrochloride

To a solution of 965 mg. (2 mmole) of p-nitrobenzyl 7-phenoxyacetamido-3-methylenecepham-4-carboxylate in 10 ml. of methylene chloride were added 175 mg. of dry pyridine and 460 mg. of phosphorus pentachloride and the mixture was stirred at room temperature for 6 hours. One ml. of isobutanol was added to the mixture which was then stored at 0°C. overnight. The reaction product, p-nitrobenzyl 7-amino-3-methylenecepham-4-carboxylate hydrochloride, which formed as a crystalline precipitate was filtered to yield 430 mg. (58% yield).

Elemental Analysis for $C_{15}H_{16}N_3O_5SCl$: Theory: C, 46.69; H, 4.18; N, 10.89. Found: C, 46.40; H, 4.20; N, 10.62.

I.R. (Nujol Mull): Carbonyl absorption at 5.65 ($\beta$-lactam) and 5.75 (ester) microns.

N.M.R. (DMSO $d_6$) signals at 6.34 (2d, 2H, $C_2$—$H_2$), 4.98 (d, 1H, $C_6$—H); 4.7–4.4 (m, 6H, $C_4$—H, ester $CH_2$, $C_4$—$CH_2$ and $C_7$—H); and 2.4–1.6 (m, 4H, aromatic H) tau.

EXAMPLE 2 p-Nitrobenzyl 7-amino-3-hydroxy-3-cephem-4-carboxylate hydrochloride

A solution of 4 g. of p-nitrobenzyl 7-amino-3-methylenecepham-4-carboxylate hydrochloride in 620 ml. of methanol was cooled in a dry ice-acetone bath and ozone was bubbled through the cold solution for about 20 minutes. The reaction mixture was purged of the remaining ozone by passing nitrogen through the solution and 10 g. of sodium bisulfite were added.

The reaction mixture was stirred for 1 hour at ice-bath temperature at which time the mixture gave a negative potassium iodide starch test.

The mixture was evaporated in vacuo to yield the reaction product as an amorphous yellow residue. The residue was crystallized in acetone to yield 3.4 g. of p-nitrobenzyl 7-amino-3-hydroxy-3-cephem-4-carboxylate hydrochloride as a crystalline acetone solvate.

I.R. (Nujol Mull): Carbonyl absorption bands at 5.60 ($\beta$-lactam) and 6.04 (ester carbonyl hydrogen bonded to 3 hydroxy) microns.

N.M.R. (DMSO $d_6$): signals at 7.92 (s, 3H, ½ mole acetone), 6.22 (2d, 2H, $C_2$—$H_2$), 5.07 (d, 1H, $C_6$H), 4.8–4.5 (m, 3H, ester $CH_2$ and $C_7$H), 2.4–1.6 (m, 4H, aromatic H) tau.

EXAMPLE 3 p-Methoxybenzyl 7-phenoxyacetamido-3-hydroxy-3-cephem-4-carboxylate

A solution of 2.5 g. of p-methoxybenzyl 7-phenoxyacetamido-3-methylenecepham-4-carboxylate in 350 ml. of ethyl acetate was cooled in an acetone-dry ice bath. Ozone was bubbled through the cold solution for 8 minutes and then oxygen was passed through the ozonized reaction mixture to expel excess ozone. The intermediate ozonide was decomposed by adding to the reaction mixture 25 g. of sodium bisulfite with stirring at a temperature of about 0°C. The reaction solution was decanted and was washed successively with water, 5% hydrochloric acid and a saturated solution of sodium chloride. The washed mixture was dried and evaporated to yield the reaction product, p-methoxybenzyl 7-phenoxyacetamido-3-hydroxy-3-cephem-4-carboxylate as an amorphous solid.

N.M.R. (CDCl$_3$): signals at
6.73 (s, 2H, $C_2H_2$),
6.23 (s, 3H, p-methoxy),
5.53 (s, 2H, side-chain $CH_2$),
5.03 (d, 1H, $C_6$H),
4.87 (s, 2H, ester $CH_2$),
4.47 (q, 1H, $C_7$H),
3.40–2.50 (m, 9H, aromatic H),
2.33 (d, 1H, amide NH), and
1.53 (broad s, 1H, 3 OH) tau.

EXAMPLE 4 p-Nitrobenzyl 7-[2-(2-thienyl)acetamido]-3-hydroxy-3-cephem-4-carboxylate.

To a solution of 1.55 g. of p-nitrobenzyl 7-amino-3-hydroxy-3-cephem-4-carboxylate hydrochloride in 30 ml. of acetone containing 364 mg. (0.5 ml., 3.6 mmole) of triethylamine was added 962 mg. of urea. With stirring at room temperature, a solution of 730 mg. (4.4 mmole) of 2-thiophene acetyl chloride in 20 ml. of acetone was added dropwise to the mixture. After 2.5 hours the reaction mixture was filtered and evaporated. The residue was dissolved in ethyl acetate and the solution was washed successively with water, a 5% solution of sodium bicarbonate, 5% hydrochloric acid, and a saturated solution of sodium chloride. The washed solution was dried and then was concentrated by evaporation in vacuo to yield 1.2 g. of the reaction product as a crystalline residue. The product was recrystallized from ethyl acetate to yield pure p-nitrobenzyl 7-[2-(2-thienyl)acetamido]-3-hydroxy-3-cephem-4-carboxylate having the following spectral properties.

I.R. (Nujol Mull): absorption peaks at 3.0 (amide NH), 5.68 ($\beta$-lactam carbonyl), and 6.1 (amide, and ester hydrogen bonded to 3 OH) microns.

N.M.R. (CDCl$_3$/DMSO $d_6$): signals at 6.54 (2d, 2H, $C_2H_2$), 6.16 (s, 2H, side-chain $CH_2$), 4.90 (d, 1H, $C_6$H) 4.60 (d, 2H, ester $CH_2$), 4.43 (q, 1H, $C_7$H), 3.1–1.6 (m, 7H, aromatic H) and 1.30 (d, 1H, amide NH) tau.

EXAMPLE 5 p-Nitrobenzyl 7-acetamido-3-hydroxy-3-cephem-4-carboxylate

A solution of 10 mmole of p-nitrobenzyl 7-amino-3-hydroxy-3-cephem-4-carboxylate hydrochloride in a mixture of 325 ml. of acetone and 125 ml. of water was cooled in an ice-water bath. With stirring a stream of ketene gas was bubbled through the solution for 30 minutes. Thereafter the reaction mixture was evaporated to remove acetone and the aqueous residue was slurried with ethyl acetate. The ethyl acetate layer was separated and was washed with 5% hydrochloric acid and a saturated solution of sodium chloride. The washed extract was dried and evaporated in vacuo to yield the reaction product as a crystalline residue. The residue was triturated with diethyl ether and vacuum dried to yield 3.55 g. of p-nitrobenzyl 7-acetamido-3-hydroxy-3-cephem-4-carboxylate melting at about 146°–152°C. with decomposition.

Elemental analysis for: $C_{16}H_{15}N_3O_7S$: Theory: C, 48.85; H, 3.84; N, 10.68. Found: C, 48.97; H, 3.96; N, 10.42.

I.R. (CHCl$_3$): absorption bands at 2.9 and 3.0 (amide NH and OH), 5.63 ($\beta$-lactam carbonyl) and 5.95 (broad, amide, and ester carbonyl hydrogen bonded to 3 OH) microns.

N.M.R. (CDCl$_3$): signals at 7.90 (s, 3H, 7-acetamido CH$_3$), 6.55 (s, 2H, $C_2H_2$), 4.92 (d, 1H, $C_6$H), 4.63 (m, 2H, ester $CH_2$), 4.30 (q, 1H, $C_7$H), 2.81 (d, 1H, amide NH), 2.5–1.8 (m, 4H, aromatic H), and 2.8 (s, 1H, $C_3$ OH) tau.

Electrometric titration (66% aqueous DMF) pKa 5.

EXAMPLE 6

Diphenylmethyl 7-[2-(2-thienyl)acetamido]-3-chloro-3-cephem-4-carboxylate a. To a solution of 34 g. (100 mmole) of 7-[2-(2-thienyl)acetamido]-3-methylenecepham-4-carboxylic acid in 500 ml. of methylene chloride was added 21.4 g. (110 mmole) of diphenyl diazomethane and the resulting mixture was stirred for 2 hours at room temperature. The solvent was evaporated under reduced pressure and the residue was dissolved in ethyl acetate. The ethyl acetate solution was washed with a 5% solution of sodium bicarbonate, then with water and was dried over magnesium sulfate. The dried solution was concentrated to a small volume. On standing 40 g. of diphenylmethyl 7-[2-(2-thienyl)acetamido]-3-methylenecepham-4-carboxylate melting at about 132°–133°C. precipitated as a crystalline solid.

IR (chloroform): absorption peaks at 2.9 (amide N—H), 5.65, 5.75 and 5.93 ($\beta$-lactam, ester and amide carbonyls respectively) and 6.62 (amide II) microns.

NMR (CDCl$_3$): signals at 6.72 (ABq, 2H, C$_2$—H$_2$), 6.21 (s, 2H, $\alpha$-CH$_2$), 4.83–4.65 (m, 4H, C$_4$—H, C$_6$—H and C$_3$—CH$_2$), 4.39 (q, 1H, C$_7$—H), 3.4–2.65 (m, 15H, C$_7$—NH, ester CH and aromatic H) tau.

b. To the solution of 8.1 g. (16 mmole) of the above ester in 80 ml. of methylene chloride were added 1.57 g. (1.6 ml, 19.6 mmole) of dry pyridine and 3.8 g. (18.1 mmole) of phosphorus pentachloride. The reaction mixture was stirred for 2 hours at room temperature and was thereafter cooled in an ice-water bath. The cold mixture was treated with 8 ml. of isobutanol with stirring. Stirring was continued for 2 hours during which time 3 g. of diphenylmethyl 7-amino-3-methylenecepham-4-carboxylate hydrochloride formed as a crystalline precipitate. The product was filtered and washed with methylene chloride and vacuum dried.

Elemental analysis (percent) for C$_{21}$H$_{21}$N$_2$O$_3$SCl: Theory: C, 60.50; H, 5.08; N, 6.72; Cl, 8.50; Found: C, 60.70; H, 5.02; N, 6.71; Cl, 8.80.

NMR (DMSO d$_6$): signals at 6.45 (ABq, 2H, C$_2$—H$_2$), 5.00 (d, 1H, C$_6$—H), 4.68 (d, 1H, C$_7$—H), 4.60 (s, 2H, 3—CH$_2$), 4.44 (s, 1H, C$_4$—H), 3.10 (s, 1H, ester CH), and 2.61 (s, 10H, aromatic H) tau.

c. The 7-amino-3-exomethylenecepham ester hydrochloride salt product, 2.1 g. (5 mmole) was dissolved in 200 ml. of methanol and the solution was cooled in an acetone-dry ice bath. Ozone was bubbled into the cold solution for 7 minutes to form the intermediate ozonide. The ozonide was decomposed by passing a stream of sulfur dioxide gas through the reaction mixture for 2 minutes. Thereafter the reaction mixture was evaporated and the residue was triturated with diethyl ether to yield 1.6 g. of diphenylmethyl 7-amino-3-hydroxy-3-cephem-4-carboxylate hydrochloride as a crystalline solid.

NMR (CDCl$_3$): signals at 6.4 (ABq, 2H, C$_2$—H$_2$), 5.0–4.5 (m, 2H, C$_6$—H and C$_7$—H), 3.2–2.4 (m, 11H, ester CH and aromatic H) tau.

IR (chloroform): carbonyl absorption peaks at 5.57 and 5.70 ($\beta$-lactam and ester carbonyl respectively) microns.

UV (pH7 buffer): $\lambda$ max 275 m$\mu$, $\epsilon$=7550.

Electrometric titration (60% aq. DMF): titratable groups at 4.5 and 6.5.

d. To a solution of 840 mg. of diphenylmethyl 7-amino-3-hydroxy-3-cephem-4-carboxylate in 10 ml. of water and 10 ml. of acetone was added one gram of sodium bisulfite. The mixture was stirred and 800 mg. of thiophene-2-acetyl chloride in 10 ml. of acetone were added dropwise. The mixture was stirred for 4.5 hours at room temperature and was then evaporated under reduced pressure. The residue was dissolved in a mixture of ethyl acetate and an aqueous 5% solution of sodium bicarbonate. The ethyl acetate layer was separated, washed with water and dried. The dried solution was evaporated and the residue triturated with ether to yield 500 mg. of diphenylmethyl 7-[2-(2-thienyl)acetamido]-3-hydroxy-3-cephem-4-carboxylate.

NMR (CDCl$_3$): signals at 6.79 (s, 2H, C$_2$—H$_2$), 6.16 (s, 2H, $\alpha$—CH$_2$), 5.0 (d, 1H, C$_6$—H), 4.32 (q, 1H, C$_7$—H), 3.05–2.46 (m, 15H, C$_7$—NH, ester CH and aromatic H) tau.

I.R. (chloroform): absorption peaks at 2.9 (amide NH), 5.6, 5.73 and 5.95 ($\beta$-lactam, ester and amide carbonyls respectively) and 6.65 (amide II) microns.

e. To a solution of 4.2 g. of diphenylmethyl 7-[2-(2-thienyl)acetamido]-3-hydroxy-3-cephem-4-carboxylate in 44 ml. of dry dimethylformamide was added 865 mg. of phosphorus trichloride. The mixture was stirred for 1.5 hours at room temperature and was poured into an ethyl acetate 5% aqueous hydrochloric acid mixture. The ethyl acetate layer was evaporated, was washed with 5% hydrochloric acid, water and was dried. The dried solution was concentrated in vacuo and the product crystallized. The 3-chloro ester was filtered, washed with cold ethyl acetate and dried to yield 2.2 g.

Elemental analysis (percent) for C$_{26}$H$_{21}$N$_2$O$_4$S$_2$Cl: Theory: C, 59.48; H, 4.03; N, 5.34; Cl, 6.75. Found: C, 59.77, H, 4.25; N, 5.40; Cl, 6.91.

NMR (CDCl$_3$): signals at 6.49 (ABq, 2H, C$_2$—H$_2$), 6.22 (s, 2H, $\alpha$—CH$_2$), 5.08 (d, 1H, C$_6$—H), 4.19 (q, 1H, C$_7$—H), 3.13–2.5 (m, 15H, C$_7$—NH, ester CH, and aromatic H) tau.

I.R. (CHCl$_3$): absorption peaks at 2.9 (amide NH), 5.55, 5.72 and 5.90 ($\beta$-lactam, ester and amide carbonyls) and 6.60 (amide II) microns.

U.V. (dioxane): $\lambda$ max 275 m$\mu$, $\epsilon$=8700.

EXAMPLE 7 p-Nitrobenzyl 7-[2-(2-thienyl)acetamido]-3-chloro-3-cephem-4-carboxylate. (via thionyl chloride).

To a solution of 1.9 g. (4 mmole) of p-nitrobenzyl 7-[2-(2-thienyl)acetamido]-3-hydroxy-3-cephem-4-carboxylate in 10 ml. of DMF (dried over a molecular sieve) was added 950 mg. (0.58 ml., 8 mmole) of freshly distilled thionyl chloride. The mixture was stirred at room temperature for 6.5 hours and was then poured into 100 ml. of ethyl acetate. The mixture was extracted three times with 30 ml. portions of 5% hydrochloric acid and with a saturated solution of sodium chloride. The washed ethyl acetate solution was filtered and evaporated to dryness in vacuo. The residue was triturated with ether to yield 1.2 g. of p-nitrobenzyl 7-[2-(2-thienyl)acetamido]-3-chloro-3-cephem-4-carboxylate as a brown crystalline solid melting at about 164°–166°C.

Elemental analysis (percent) for $C_{20}H_{16}N_3O_6S_2Cl$: Theory: C, 48.63; H, 3.27; N, 8.51; Cl, 7.18. Found: C, 48.47; H, 3.29; N, 8.78; Cl, 6.96.

IR (Chloroform) showed absorption bands at 2.9 (amide NH), 5.59 ($\beta$-lactam carbonyl), 5.75 (ester carbonyl) and 5.92 microns (amide carbonyl).

UV absorption spectrum (acetonitrile) showed maxima at $\lambda$ max 235 m$\mu$, $\epsilon$ = 12,100 and $\lambda$ max 268 m$\mu$, $\epsilon$ = 15,800.

The mass spectrum of the product showed a molecular ion of 493 m/e.

NMR (CDCl$_3$) showed signals at 6.39 (ABq, 2H, $C_2$—$H_2$), 6.17 (s, 2H, $\alpha$—$CH_2$), 4.99 (d, 1H, $C_6$—H), 4.64 (s, 2H, ester $CH_2$), 4.19 (q, 1H, $C_7$—H), 3.45 (d, 1H, $C_7$—NH), 3.1–1.67 (m, 7H, aromatic H) tau.

EXAMPLE 8 p-Nitrobenzyl 7-[2-(2-Thienyl)acetamido]-3-chloro-3-cephem-4-carboxylate (via phosphorus trichloride)

To a cooled solution of 439 mg. (0.93 mmole) of p-nitrobenzyl 7-[2-(2-thienyl)acetamido]-3-hydroxy-3-cephem-4-carboxylate in 4.4 ml. of DMF was slowly added 85 mg. (0.05 ml., 0.63 mmole) of phosphorus trichloride. The reaction mixture was allowed to stand for 4 hours at room temperature and thereafter the reaction product mixture was worked-up by following the recovery procedures described in Example 6 to provide 374 mg. of p-nitrobenzyl 7-[2-(2-thienyl)acetamido]-3-chloro-3-cephem-4-carboxylate. The NMR spectrum of the product was consistent with the expected product and with that of the compound of Example 7.

EXAMPLE 9

7-Phenoxyacetamido-3-chloro-3-cephem-4-carboxylic acid

Following the chlorination procedure of Example 6 p-nitrobenzyl 7-phenoxyacetamido-3-chloro-3-cephem-4-carboxylate was prepared with phosphorus trichloride. The p-nitrobenzyl ester group was removed by hydrogenolysis with hydrogen and 5% Pd/C to provide the 3-chlorocephalosporanic acid antibiotic compound.

EXAMPLE 10 p-Nitrobenzyl 7-[2-(2-thienyl)acetamido]-3-hydroxy-3-cephem-4-carboxylate (via oxalyl chloride)

To a solution of 439 mg. (0.93 mmole) of p-nitrobenzyl 7-[2-(2-thienyl)acetamido]-3-hydroxy-3-cephem-4-carboxylate in 4.4 ml. of DMF cooled in an ice bath was added dropwise 118 mg. (0.07 ml., 9.93 mmole) of oxalyl chloride. The reaction mixture was allowed to stand for 4 hours at room temperature and was then poured into a mixture of aqueous 5% hydrochloric acid and ethyl acetate. The organic layer was separated and was washed sequentially with 5% hydrochloric acid, water and a saturated solution of sodium chloride. The washed layer was dried and evaporated to dryness to yield the reaction product, p-nitrobenzyl 7-[2-(2-thienyl)acetamido]-3-chloro-3-cephem-4-carboxylate as an amorphous solid. The product was obtained crystalline by triturating the amorphous residue with ether. Yield 360 mg. The infrared spectrum and NMR spectrum of the crystalline product were consistent with the spectra of authentic material.

EXAMPLE 11

7-[2-(2-Thienyl)acetamido]-3-bromo-3-cephem-4-carboxylic acid

To a solution of 19 g. (40 mmole) of p-nitrobenzy 7-[2-(2-thienyl)acetamido]-3-hydroxy-3-cephem-4-carboxylate in 300 ml. of dry DMF was added 15 g. (5( mmole) of phosphorus tribromide and the reactior mixture was stirred at room temperature overnight The reaction mixture was poured into a mixture o ethyl acetate and water and the organic phase was sep arated and washed repeatedly with water and driec over magnesium sulfate. The dried organic phase wa: evaporated in vacuo to dryness. The crude reactior product residue weighing about 9 g. was purified b; chromatography over 500 g. of silica gel using ethy acetate-hexane (55:45 v:v) as eluent. The eluate wa: evaporated to dryness under reduced pressure and th( product, p-nitrobenzyl 7-[2-(2-thienyl)acetamido]-3 bromo-3-cephem-4-carboyxlate was obtained crystal line by triturating the dry residue with diethyl ether.

U.V. (ethanol) $\lambda$max. 270 m$\mu$ ($\epsilon$ = 13,300) and $\lambda$max 243 m$\mu$ ($\epsilon$ = 12,700).

Elemental analysis calculated for $C_{20}H_{16}BrN_3O_6S_2$ Theory: C, 44.61; H, 3.00; N, 7.81; Br, 14.84. Found C, 44.78; H, 3.03; N, 7.65; Br, 14.91.

Nuclear magnetic resonance spectrum (DMSO d6 showed signals at 6.21 (s, 2H, $\alpha$—$CH_2$), 5.98(ABq, 2H $C_2$—$H_2$), 4.72 (d, 1H $C_6$—H), 451 (s, 2H, es ter—$CH_2$), 420 (q, 1H, $C_7$—H), 3.04–1.74 (m, 7H; aro matic H) and 0.66 (d, 1H, $C_7$—CH) tau.

The above 3-bromo ester was de-esterified in the fol lowing manner. The ester, 545 mg. (1.0 mmole) wa hydrogenated at room temperature in ethanol in th presence of prereduced 5 percent palladium-on-carboi catalyst. The catalyst was filtered and the filtrate evap orated under reduced pressure to dryness. The residue product was triturated with diethyl ether to yield 18' mg (44 percent) of crystalline product, 7-[2-(2-thieny) )acetamido]-3-bromo-3-cephem-4-carboxylic acid.

Electrometric titration (66 percent aqueous DMF showed a pKa of 4.4 and an apparent molecular weigh of 393. The calculated molecular weight = 403. Ele mental analysis calculated for $C_{13}H_{11}BrN_2O_4S_2$.

½ diethyl etherate: Theory: C, 40.91; H, 3.66; N 6.36; Br, 18.15. Found: C, 41.29; H, 3.20; N, 6.29; Br 18.50.

Nuclear magnetic resonance spectrum (CDCl; showed signals at 8.8 (t, diethyl ether-$CH_3$), 6.68–5.8 (m, $C_2$—$H_2$, $\alpha$—$CH_2$ and diethyl ether—$CH_2$), 4.90 (( 1H, $C_6$—H), 3.0–2.63 (m, 3H, aromatic-H), and 1.9 (( 1H, amide NH) tau.

EXAMPLE 12

7-[2-(2-Thienyl)acetamido]-3-fluoro-3-cephem-4-cai boxylic acid

To a solution of 325 mg. (0.7 mmole) of p-nitrobei zyl 7-[2-(2-thienyl)acetamido]-3-hydroxy-3-cephen 4-carboxylate in 10 ml. of methylene chloride w: slowly added an equivalent amount of N-(2-chlor 1,1,2-trifluoroethyl) diethylamine. The reaction mi ture was heated for 30 minutes under gentle reflux ar was then evaporated to dryness in vacuo. The residt was dissolved in a mixture of ethyl acetate-water ar the organic layer was separated. The organic layer w washed with 5% hydrochloric acid, water and brine ar was then dried. The dried reaction product solutic was concentrated to a small volume and n-hexane was added to precipitate, p-nitrobenzyl 7-[2-(2-thienyl)acetamido]-3-fluoro-3-cephem-4-carboxylate.

The ester group was removed by catalytic hydrogenolysis to yield the 3-fluoro cephalosporin free acid antibiotic.

EXAMPLE 13 p-Nitrobenzyl 7-amino-3-chloro-3-cephem-4-carboxylate hydrochloride

To a solution of 500 mg. of p-nitrobenzyl 7-[2-(2-thienyl)acetamido]-3-chloro-3-cephem-4-carboxylate in 6 ml. of methylene chloride was added 95 mg. of dry pyridine and 237 mg. of phosphorus pentachloride. The reaction mixture was stirred at room temperature for 1.5 hours, was thereafter cooled in an ice-water bath to about 5°C. and 0.6 ml. of isobutyl alcohol were added. On continued cooling and stirring the reaction product, p-nitrobenzyl 7-amino-3-chloro-3-cephem-4-carboxylate hydrochloride, crystallized from the reaction mixture. The product was filtered, washed with cold methylene chloride and dried to yield 200 mg. of the crystalline product melting with decomposition at about 168°C.

Percent elemental composition for $C_{14}H_{13}ClN_3O_5S\cdot HCl$: Theory: C, 41.39; H, 3.20; N, 10.34; Cl, 17.45. Found: C, 41.14; H, 3.31; N, 10.44; Cl, 17.29.

I.R. (nujol mull): showed absorption bands at 5.55 ($\beta$-lactam carbonyl) and at 5.78 (ester carbonyl) microns.

UV (pH 7 buffer): showed absorption maximum $\lambda$ max 268 m$\mu$ ($\epsilon = 13,800$).

N.M.R. (DMSOd$_6$): signals at 5.97 (s, 2H, $C_2$—$H_2$), 4.8–4.5 (m, 4H, $C_6$—H and ester $CH_2$), and 2.35–1.6 (q, 4H, aromatic H) tau.

EXAMPLE 14

7-Amino-3-chloro-3-cephem-4-carboxylic acid

To a solution of 750 mg. (1.85 mmole) of p-nitrobenzyl 7-amino-3-chloro-3-cephem-4-carboxylate hydrochloride in 20 ml. of tetrahydrofuran and 40 ml. of methanol was added a suspension of 750 mg. of pre-reduced 5% palladium on carbon catalyst in 20 ml. of ethanol and the suspension was hydrogenated under 50 psi of hydrogen at room temperature for 45 minutes. The catalyst was filtered and washed with THF and water. The filtrate and catalyst washes were combined and evaporated to dryness. The residue was dissolved in a water-ethyl acetate mixture and the pH adjusted to pH 3. The insoluble product was filtered and triturated with acetone. The product was then dried to yield 115 mg. of 7-amino-3-chloro-3-cephem-4-carboxylic acid.

I.R. (mull): absorption peaks at 5.61 ($\beta$-lactam carbonyl), and 6.2 (carboxylic acid).

NMR ($D_2O$—$NaHCO_3$): signals at 6.25 (ABq, 2H, $C_2$—$H_2$) 4.88 (d, 1H, $C_6$—H) and 4.54 (d, 1H, $C_7$—H) tau.

U.V. (pH 7 buffer): absorption maximum at $\lambda$ max 265 m$\mu$, $\epsilon = 7550$.

EXAMPLE 15

Diphenylmethyl 7-amino-3-chloro-3-cephem-4-carboxylate

To a solution of 525 mg. of diphenylmethyl 7-[2-(2-thienyl)acetamido]-3-chloro-3-cephem-4-carboxylate in 20 ml. of methylene chloride was added 0.1 ml. of dry pyridine and 237 mg. of phosphorus pentachloride. The reaction mixture was stirred for 2 hours at room temperature and was then cooled in an ice-water mixture. To the cold mixture was added 0.6 ml. of isobutanol and after 30 minutes the reaction mixture was evaporated. The residue was dissolved in ethyl acetate and the solution was washed with 5% sodium bicarbonate and with water and was dried. The dried solution was evaporated to dryness and the residue was triturated with ether to yield 190 mg. of 3-chloro nucleus ester, diphenylmethyl 7-amino-3-chloro-3-cephem-4-carboxylate.

I.R. (mull): absorption peaks at 5.7 and 5.9 ($\beta$-lactam and ester carbonyl) microns.

NMR (CDCl$_3$): signals at 6.35 (ABq, 2H, $C_2$—$H_2$), 4.78 (2d, 2H, $C_6$—H and $C_7$—H), 3.05 (s, 1H, ester CH) and 2.65 (s, 10H, aromatic H).

EXAMPLE 16

Following the 7-acyl side chain cleavage reaction conditions described in Example 15 p-nitrobenzyl 7-amino-3-fluoro-3-cephem-4-carboxylate is prepared with the intermediate of Example 12, p-nitrobenzyl 7-[2-(2-thienyl)acetamido]-3-fluoro-3-cephem-4-carboxylate.

EXAMPLE 17

Following the 7-acyl side chain cleavage reaction procedure described by Example 13 diphenylmethyl 7-amino-3-bromo-3-cephem-4-carboxylate is prepared with diphenylmethyl 7-phenoxyacetamido-3-bromo-3-cephem-4-carboxylate.

EXAMPLE 18

7-(D-$\alpha$-Phenylglycylamido)-3-chloro-3-cephem-4-carboxylic acid

To a suspension of 280 mg. (1.2 mmole) of 7-amino-3-chloro-3-cephem-4-carboxylic acid in 14 ml. of acetonitrile was added with stirring at room temperature 0.5 ml. of N,O-bis-(trimethylsilyl)acetamide to form the soluble disilylmethyl derivative thereof. The solution was cooled to 0°C. and was slowly added to a solution of the mixed anhydride formed by reacting 408 mg. (1.5 mmole) of methyl 3-$\alpha$-carboxybenzylaminocrotonate sodium salt with 161 mg. (1.7 mmole) of methyl chloroformate in the presence of 2 drops of dimethylbenzyl amine in 7 ml. of acetonitrile. The mixture was stirred at ice bath temperature for 2 hours, 1 ml. of methanol was added and the mixture was filtered to remove insoluble impurities. Two milliliters of water were added to the filtrate and the pH was adjusted momentarily to pH 1.5, to effect removal of the enamine block, and then to pH 4.5 with triethylamine. After stirring for an additional hour at ice-bath temperature the reaction product, 7 -(D-$\alpha$-phenylglycylamido)-3-chloro-3-cephem-4-carboxylic acid (zwitterion) precipitated from the reaction mixture as a crystalline solid. The product was filtered, was washed with acetonitrile and dried in vacuo to yield 200 mg.

The product has the following physical characteristics:

Elemental analysis for $C_{15}H_{14}N_3O_4SCl \cdot \frac{1}{2} H_2O$: Theory: C, 47.80; H, 4.01; N, 11.15; Cl, 9.40%. Found: C, 47.55; H, 4.12; N, 10.98; Cl, 9.21%.

I.R. Spectrum (mull): absorption peaks at 2.9 (amide NH), 5.70 ($\beta$-lactam carbonyl), 5.95 (amide carbonyl) and 6.28 (carboxylate) microns.

NMR Spectrum ($D_2O/DCl$): signals at 6.5–6.7 (ABq, 2H, $C_2$—$H_2$), 4.84 (d, 1H, $C_6$—H), 4.26 (d, 1H, $C_7$—H) and 2.44 (s, 5H, aromatic H) tau.

UV Spectrum (pH 7 buffer): $\lambda$ max 265 m$\mu$ ($\epsilon = 6,800$).

EXAMPLE 19

To a solution of 500 mg. (1.85 mmole) of methyl 3-$\alpha$-carboxybenzylaminocrotonate sodium salt (formed with phenylglycine and methyl acetoacetate) in 20 ml. of acetonitrile was added 4 drops of dimethylbenzylamine and the solution was cooled in a dry ice-carbon tetrachloride mixture with stirring. To the cold solution was slowly added 184 mg. (1.95 mmole) of methyl chloroformate to form the mixed anhydride. After 20 minutes a pre-cooled solution of 750 mg. (1.85 mmole) of p-nitrobenzyl 7-amino-3-chloro-3-cephem-4-carboxylate and 188 mg. (1.85 mmole) of triethylamine in 40 ml. of acetone was added. The addition took place over 3 minutes and thereafter the reaction mixture was stirred in the cold for 30 minutes and then at room temperature for 2 hours. The reaction mixture was filtered to remove insoluble impurities and was evaporated in vacuo. The reaction product residue was dissolved in a mixture of ethyl acetate-water and the pH of the solution was adjusted to pH 7. The organic layer was separated and washed with water. After drying over magnesium sulfate the organic layer was concentrated under vacuum to a small volume. Upon addition of n-hexane to the concentrate, 620 mg. of p-nitrobenzyl 7-[N-(1-carbomethoxy-2-propenyl)-D-$\alpha$-phenylglycylamido]-3-chloro-3-cephem-4-carboxylate precipitated from the reaction mixture.

The product gave the following elemental analysis and nuclear magnetic resonance spectrum:

Elemental analysis for $C_{27}H_{26}N_4O_8SCl$: Theory: C, 53.87; H, 4.35; N, 9.31%. Found: C, 54.05; H, 4.13; N, 9.36%.

NMR (DMSO $d_6$): signals at 8.20 (s, 3H, enamine $CH_3$), 6.60 (ABq, 2H, $C_2$—$H_2$), 6.45 (s, 3H, ester $CH_3$), 5.48 (s, 1H, enamine vinyl H), 4.90–4.1 (m, 5H, $C_6$—H, $C_7$—H, $\alpha$-CH and ester $CH_2$) and 3.10–1.5 (m, 9H, aromatic H) tau.

The product, 540 mg. (0.9 mmole) was dissolved in 40 ml. of acetonitrile containing 20 ml. of water and the solution was first cooled in an ice-water mixture and then acidified momentarily to pH 1.5 and thereafter adjusted to pH 2.5. The mixture was evaporated and the residue was dissolved in 40 ml. of tetrahydrofuran and 80 ml. of methanol.

To the solution was added 540 mg. of 5% palladium on carbon (prereduced in 20 ml. of ethanol for 45 min. under 50 psi hydrogen at room temperature) and the solution was hydrogenated at room temperature for 2.5 hr. under 50 psi hydrogen pressure. The catalyst was filtered and was washed on the filter with methanol, THF and with water. The filtrate and washes were combined and evaporated to dryness in vacuo. The reaction product residue was dissolved in water-ethyl acetate and the pH of the solution was adjusted to pH 4.5. The aqueous phase was separated, was washed with ethyl acetate and was evaporated to a small volume of about 2 ml. On cooling, 65 mg. of the product, 7-(D-$\alpha$-phenylglycylamido)-3-chloro-3-cephem-4-carboxylic acid, precipitated as a crystalline solid from the cold concentrate.

EXAMPLE 20

To a suspension of 3.0 g. (8.1 mmole) of p-nitrobenzyl 7-amino-3-chloro-3-cephem-4-carboxylate in 200 ml. of tetrahydrofuran (dried with molecular sieve) were added 2.1 g. (8.3 mmole) of N-(t-butyloxycarbonyl) D-$\alpha$-phenylglycine and 2.0 g. (8.3 mmole) of N-ethoxycarbonyl-2-ethoxy-1,2-dihydroquinoline (EEDQ). The reaction mixture was stirred overnight at room temperature and the solvent was evaporated under reduced pressure. The residue was dissolved in a mixture of ethyl acetate and water and the organic phase was separated. The organic phase was cooled and successively washed with a cold 5 percent aqueous solution of sodium bicarbonate, a cold solution of 5 percent hydrochloric acid, and then with water. The washed solution was dried over magnesium sulfate, filtered, and concentrated by evaporation under reduced pressure to a volume of about 50 ml. From the concentrate, 3.7 g. (63 percent yield) of the reaction product p-nitrobenzyl 7-[D-2-(t-butyloxycarbamido)-2-phenylacetamido]-3-chloro-3-cephem-4-carboxylate, was obtained as a crystalline product. A second crop of the product weighing about 2 g. was obtained by further concentration of the filtrate obtained after filtering the first crop material.

Elemental analysis calculated for $C_{27}H_{27}ClN_4O_8S$ Theory: C, 53.78; H, 4.51; N, 9.29. Found: C, 52.66; H, 4.36; N, 8.88.

U.V. (Acetonitrile) showed a maximum at 268 m$\mu$ ($\epsilon = 17,100$).

I.R. (mull): The following significant absorption peaks were observed in the infrared spectra of the product. Amide NH absorption peak at 3.05 m$\mu$ and carbonyl absorption peaks at 5.59, 5.75, and 6.0 m$\mu$.

NMR ($CDCl_3$): signals at 8.60 (s, 9H, t—BOC), 6.45 (ABq, 2H, $C_2$—$H_2$), 5.03 (d, 1H, $C_6$—H), 4.67 (s, 3H $\alpha$-CH and ester $CH_2$), 4.12 (m, 3H, $C_7$—H and amide NH), and 2.72–1.74 (m, 10H, aromatic H and amide NH) tau.

To a solution of 3.0 g. (5.0 mmole) of the product in 15 ml. of dry tetrahydrofuran (dried with molecular sieve) and 185 ml. of methanol were added 3 g. of prereduced 5 percent palladium on carbon. The catalyst was pre-reduced in ethanol for 30 minutes at room temperature under a hydrogen pressure of 50 psi. Following the addition of the pre-reduced catalyst, the product was hydrogenated at room temperature for one hour under a hydrogen pressure of 50 psi. The catalyst was filtered and washed on the filter with tetrahydrofuran and methanol. The filtrate and washes were combined and evaporated under reduced pressure. The residue was dissolved in ethyl acetate and water was added. The pH of the mixture was adjusted to pH 7 by the addition of 1N sodium hydroxide. The aqueous phase was separated and was washed with ethyl acetate. The aqueous phase was then layered with ethyl acetate and back titrated to pH 2.5 with 1N hydrochloric acid. The organic phase was separated from the aqueous phase and was washed with water and dried over magnesium sulfate. The dried organic phase was evaporated under reduced pressure to dryness to obtain the reaction product, 7-[D-2-(t-butyloxycarbamido)-2-phenylacetamido]-3-chloro-3-cephem-4-carboxylic acid, as a dry solid residue. The product was (s, 3H, side chain NH₃), 6.20 (ABq, 2H, $C_2$—$H_2$), 4.94 (broad singlet, 1H, α-CH), 4.80 (d, 1H, $C_6$—H), 4.51 (s, 2H, ester $CH_2$), 4.08 (q, 1H, $C_7$—H), 2.95–1.62 (m, 14H aromatic hydrogen and amide NH), and 0.32 (d, 1H, amide NH).

The amino deblocked p-toluenesulfonic acid salt product obtained as described above was deesterified to obtain the antibiotic aompound as follows. A solution of 1.5 g. (2.2 mmole) of the amine deblocked p-toluenesulfonic acid salt product obtained above in 10 ml. of dry dimethylformamide (dried with molecular sieve) was cooled in an ice-alcohol bath. To the cold solution was added 2 ml. of concentrated hydrochloric acid. Zinc dust, 400 mg. (6.1 mmole) was added to the cold solution portionwise over a period of about 15 minutes. The reaction mixture was stirred in the cold for 30 minutes and was then allowed to warm to room temperature with continued stirring. The reaction mixture was stirred at room temperature for about one hour and was filtered. The pH of the filtrate was adjusted to 6.8 with triethylamine. The product, 7-(D-phenylglycylamido)-3-chloro-3-cephem-4-carboxylic acid as the bis-dimethylformamide solvate of the zwitterion, formed as a white crystalline precipitate. The product was filtered, washed with 10 ml. of cold dimethylformamide and then with 6 ml. of diethyl ether. The washed product was vacuum dried to yield 800 mg. (71 percent).

Elemental analysis calculated for $C_{21}H_{28}ClN_5O_6S$·2DMF: Theory: C, 49.07; H, 5.49; N, 14.63; Cl, 6.90. Found: C, 48.84; H, 5.53; N, 13.48; Cl, 7.18.

Ultraviolet absorption spectrum (acetonitrile): maximum at 265 mμ (ε = 6,000).

Nuclear magnetic resonance spectrum (DMSO d₆): signals at 7.70 (s, 3H, p-toluenesulfonic acid salt-$CH_3$), 6.61 (s, 3H, side chain NH₃), 6.20 (ABq, 2H, $C_2$-$H_2$), 4.94 (broad singlet, 1H, α—CH), 4.80 (d, 1H, $C_6$—H), 4.51 (s, 2H, ester $CH_2$), 4.08 (q, 1H, $C_7$—H), 2.95–1.62 (m, 14H aromatic hydrogen and amide NH), and 0.32 (d, 1H, amide NH).

The amino deblocked p-toluenesulfonic acid salt product obtained as described above was deesterified to obtain the antibiotic aompound as follows. A solution of 1.5 g. (2.2 mmole) of the amine deblocked p-toluenesulfonic acid salt product obtained above in 10 ml. of dry dimethylformamide (dried with molecular sieve) was cooled in an ice-alcohol bath. To the cold solution was added 2 ml. of concentrated hydrochloric acid. Zinc dust, 400 mg. (6.1 mmole) was added to the cold solution portionwise over a period of about 15 minutes. The reaction mixture was stirred in the cold for 30 minutes and was then allowed to warm to room temperature with continued stirring. The reaction mixture was stirred at room temperature for about one hour and was filtered. The pH of the filtrate was adjusted to 6.8 with triethylamine. The product, 7-(D-phenylglycylamido)-3-chloro-3-cephem-4-carboxylic acid as a bis-dimethylformamide solvate of the zwitterion, formed as a white crystalline precipitate. The product was filtered, washed with 10 ml. of cold dimethylformamide and then with 6 ml. of diethyl ether. The washed product was vacuum dried to yield 800 mg. (71 percent).

Elemental analysis calculated for $C_{21}H_{28}ClN_5O_6S$·2DMF: Theory: C, 49.07; H, 5.49; N, 14.63; Cl, 6.90. Found: C, 48.84; H, 5.53; N, 13.48; Cl, 7.18.

Ultraviolet absorption spectrum (acetonitrile): maximum at 265 mμ (ε = 6,000).

Electrometric titration (66 percent aqueous DMF): pKa at 4.55 and 7.2.

Nuclear magnetic resonance spectrum (D₂O/DCl): signals at 6.34 (2s, 6H, DMF—$CH_3$), 6.33 (ABq, 2H, $C_2$—$H_2$), 4.85 (d, 1H, $C_6$—H), 4.64 (s, 1H, α—CH), 4.27 (d, 1H, $C_7$—H), 2.41 (s, 5H, aromatic H), and 1.84 (s, 2H, DMF—CH) tau.

EXAMPLE 21

The antiboitic compound, 7-(D-phenylglycylamido)-3-chloro-3-cephem-4-carboxylic acid, was also prepared with p-nitrobenzyl 7-[D-2-(t-butyloxycarbamido)-2-phenylacetamido]-3-chloro-3-cephem-4-carboxylate by a deblocking method alternative to that described in the preceeding example. In this method, the t-butyloxycarbonyl amino protecting group is removed first and thereafter the p-nitrobenzyl ester group is cleaved with zinc and hydrochloric acid in dimethylformamide. This alternative preparation is described in the following paragraphs.

To a solution of 2.4 g. (12.6 mmole) of p-toluene-sulfonic acid in 60 ml. of acetonitrile was added 3.6 g. (6 mmole) of p-nitrobenzyl 7-[D-2-(t-butyloxycarbamido)-2-phenylacetamido]-3-chloro-3-cephem-4-carboxylate. The reaction solution was stirred at room temperature for about 15 hours during which time the amino deblocked product, p-nitrobenzyl 7-(D-phenylglycylamido)-3-chloro-3-cephem-4-carboxylate, as the p-toluenesulfonic acid salt, formed a crystalline precipitate. The product was filtered, washed with acetonitrile and vacuum dried. Yield: 3.1 g. (81 percent).

Elemental analysis calculated for $C_{29}H_{27}ClN_4O_9S_2$: Theory: C, 51.58; H, 4.06; N, 8.29; Cl, 5.25. Found: C, 51.51; H, 4.14; N, 8.12; Cl, 5.60.

Infrared absorption spectrum (chloroform): carbonyl absorption peaks at 5.61, 5.80, and 5.95 microns. Tosylate salt absorption peak at 6.29 microns.

EXAMPLE 22

7-(D-3-hydroxyphenylglycylamido)-3-chloro-3-cephem-4-carboxylic acid

N-(t-Butyloxycarbonyl) D-3-hydroxyphenylglycine, 2.9 g. (11 mmole (was reacted with 3.7 g. (10 mmole) of p-nitrobenzyl 7-amino-3-chloro-3-cephem-4-carboxylate and 2.6 g. (10.5 mmole) of the coupling reagent EEDQ. The reaction was carried out and the product isolated by following the procedures described in the acylation process of Example 20. The product was obtained as an amorphous solid after trituration with ether to yield 2.8 g. (46 percent).

Elemental analysis calculated for $C_{27}H_{27}ClN_9S$: Theory: C, 52.39; H, 4.40; N, 9.05. Found: C, 52.16; H, 4.59; N, 8.79.

Ultraviolet absorption spectrum (acetonitrile): maximum at 270 mμ (ε = 17,200).

Nuclear magnetic resonance spectrum (CDl₃): signals at 8.59 (s, 9H, t-BOC), 6.50 (ABq, 2H, $C_2$—$H_3$), 5.06 (d, 1H, $C_6$—H), 4.66 (s, 1H, α—CH), 4.09 (m, 2H, $C_7$—H), 3.34–1.70 (m, 9H, aromatic H and amide NH) tau.

The product, p-nitrobenzyl 7-[D-2-(t-butyloxycarbamido)-2-(3-hydroxy)phenylacetamido]-3-chloro-3-cephem-4-carboxylate, 3.5 g. (5.6 mmole), was hydrogenated in ethanol in the presence of pre-reduced 5 percent palladium on carbon by following the deesterification procedure described in Example 20. The product, 7-[D-2-(t-butyloxycarbamido)-2-(3-hydroxy)-phenylacetamido]-3-chloro-3-cephem-4-carboxylic acid, was obtained crystalline by trituration of the amorphous crude product with a solution of hexane in diethyl ether. Yield: 1.5 g. (55 percent.).

Ultraviolet absorption spectrum (acetonitrile): maximum at 272 m$\mu$ ($\epsilon$ = 8,280).

Electrometric titration (66 percent aqueous DMF): pKa at 4.5.

The above product, 1.3 g. (2.7 mmole) was reacted with 1.1 g. (5.9 mmole) in 28 ml. of acetonitrile to effect the removal of the t-butyloxycarbonyl protecting group. The procedure was carried out essentially according to the method described in Example 20.

The product, 7-(D-3-hydroxyphenylglycylamido)-3-chloro-3-cephem-4-carboxylic acid, crystallized from the reaction mixture, was filtered and the vacuum dried. Yield, 700 mg. (64 percent).

Elemental analysis calculated for $C_{15}H_{14}ClN_3O_5S\cdot 1-H_2O$: Theory: C, 44.83; H, 4.01; N, 10.46. Found: C, 45.12; H, 4.06; N, 10.31.

Ultraviolet absorption spectrum (pH 6 buffer): maximum at 268 m$\mu$ ($\epsilon$ = 9,750).

Nuclear magnetic resonance spectrum ($D_2O/DCl$): signals at 6.31 (ABq, 2H, $C_2$—$H_2$), 4.81 (d, 1H, $C_6$—H), 4.52 (s, 1H, $\alpha$—CH), 4.26 (d, 1H, $C_7$—H), and 3.1–2.5 (m, 4H, aromatic H) tau.

EXAMPLE 23

7-(D-4-Chlorophenylglycylamido)-3-chloro-3-cephem-4-carboxylic acid

By following the procedures described in Example 20, 850 mg. (2.3 mmole) of p-nitrobenzyl 7-amino-3-chloro-3-cephem-4-carboxylate was acylated with 700 mg. (2.5 mmole) of N-t-butyloxycarbonyl D-4-chlorophenylglycine and 567 mg. (2.3 mmole) of EEDQ to provide 1.2 g. of p-nitrobenzyl 7-[D-2-(t-butyloxycarbamido)-2-(4-chlorophenylacetamido)]-3-chloro-3-cephem-4-carboxylate.

The product, 1.2 g. (1.9 mmole) was hydrogenated at room temperature in the presence of pre-reduced 5 percent palladium on carbon to effect the removal of the p-nitrobenzyl ester group and provide 450 mg. of 7-[D-2-(t-butyloxycarbamido)-2-(4-chlorophenylacetamido)]-3-chloro-3-cephem-4-carboxylic acid as a crystalline product. The product was obtained crystalline by trituration of the amorphous reduction product with diethyl ether. j Elemental analysis calculated for $C_{20}H_{21}Cl_2N_3O_6S$: Theory: C, 47.82; H, 4.21; N, 8.36; Cl, 14.11. Found: C, 47.75; H, 4.43; N, 8.11; Cl, 14.15.

Electrometric titration (66 percent aqueous DMF): pKa at 4.4; apparent molecular weight = 507; calculated MW=502.

The deesterification product, 450 mg. (0.9 mmole), was reacted with p-toluenesulfonic acid in acetonitrile by following the procedure described in previous examples to effect the removal of the t-butyloxycarbonyl protecting group and provide 160 mg. (44 percent) of crystalline 7-(D-4-chlorophenylglycylamido)-3-chloro-3-cephem-4-carboxylic acid in the zwitterionic form.

Elemental analysis calculated for $C_{15}H_{13}Cl_2N_3O_4S\cdot 1-H_2O$: Theory: C, 42.86; H, 3.59; N, 9.99; Cl, 16.87. Found: C, 43.07; H, 3.63; N, 9.69; Cl, 16.75.

Ultraviolet absorption spectrum (pH 5 buffer): maxima at 265 m$\mu$($\epsilon$ = 8,100) and 2.25 m$\mu$($\epsilon$ = 13,900).

Electrometric titration (66 percent aqueous DMF): pKa = 4.15 and 6.8; apparent molecular weight = 407, calculated MW 403.

EXAMPLE 24

7-(D-4-Hydroxyphenylglycylamido)-3-chloro-3-cephem-4-carboxylic acid

N-(t-butyloxycarbonyl) D-4-hydroxyphenylglycine, 2.9 g. (11 mmole) was reacted with 3.7 g. (10 mmole) p-nitrobenzyl 7-amino-3-chloro-3-cephem-4-carboxylate and 2.6 g. (10.5 mmole) of the coupling reagent EEDQ in dry tetrahydrofuran. The reaction was carried out and the product isolated by following the procedures described in the acylation process of Example 20. The product, 3.7 g. (60 percent yield) was obtained crystalline from cold diethyl ether.

The product, p-nitrobenzyl 7-[D-2-(t-butyloxycarbamido)-2-(4-hydroxy)phenylacetamido]-3-chloro-3-cephem-4-carboxylate gave the following percent elemental analysis and nuclear magnetic resonance spectrum.

Elemental analysis calculated for $C_{27}H_{27}N_4O_9SCl$: Theory: C, 52.39; H, 4.40; N, 9.05; Found: C, 52.12; H, 4.26; N, 8.91.

Nuclear magnetic resonance spectrum (DMSO $d_6$) showed signals at 8.62 (s, 9H, t—BOC—$CH_3$), 6.16 (ABq, 2H, $C_2$—$H_2$), 4.81 (d, 1H, $C_6$—H), 4.75 (d, 1H, $\alpha$—CH), 4.53 (s, 2H, ester-$CH_2$), 4.18 (q, 1H, $C_7$—H), 7.04 and 2.0 (2q, 8H, aromatic H), 0.76 (d, 1H, $C_7$—NH) and 0.58 (s, 1H, p—OH), tau.

The product, 2.2 g. (3.5 mmole) was hydrogenated in ethanol in the presence of pre-reduced 5 percent palladium-on-carbon catalyst to affect the removal of the p-nitrobenzyl group. The deesterified product, 7-[D-2-(t-butyloxycarbamido)-2-(4-hydroxy)-phenylacetamido]-3-chloro-3-cephem-4-carboxylic acid, was obtained crystalline from a mixture of diethyl ether and hexane. One gram of the product corresponding to a 59 percent yield was obtained.

Elemental analysis calculated for $C_{20}H_{22}ClN_3O_7S$: Theory: C, 49.64; H, 4.58; N, 8.08. Found: C, 48.92; H, 4.40; N, 8.24.

Nuclear magnetic resonance spectrum (DMSO $d_6$) showed signals at 8.61 (s, 9H, t—BOC—$CH_3$), 6.26 (ABq 2H, $C_2$—$H_2$), 4.89 (d, 1H, $C_6$—H), 4.78 (d, 1H, $\alpha$—CH), 4.28 (q, 1H, $C_7$—H), 3.06 (q, 4H, aromatic-H) and 1.20 (d, 1H, $C_7$—NH) tau.

The t-BOC protecting group was removed from the deesterification product by reacting the product in acetonitrile with p-toluenesulfonic acid. From the 1 g. of product was obtained 330 mg (40 percent) of the final product 7-(D-4-hydroxyphenylglycylamido)-3-chloro-3-cephem-4-carboxylic acid having the following elemental analysis, nuclear magnetic spectrum and titration values.

Elemental analysis calculated for $C_{15}H_{14}ClN_3O_5S\cdot 1-H_2O$: Theory: C, 44.83; H, 4.01; N, 10.46.

Found: C, 44.92; H, 3.45; N, 10.63.

Electrometric titration in 66 percent aqueous DMF gave pKa values of 4.2, 7.7 and 12.4. The apparent molecular weight calculated as 384; the calculated molecular weight is 383.8.

Nuclear magnetic spectrum (D₂O/DCl) showed signals at 6.32 (ABq, 2H, $C_2$—$H_2$), 4.84 (d, 1H, $C_6$—H), 4.27 (d, 1H, $C_7$—H), and 2.79 (q, 4H, aromatic-H) tau.

EXAMPLE 25 p-Nitrobenzyl 7-[2-(2-thienyl)acetamido]-3-fluoro-3-cephem-4-carboxylate

To a solution of 4.75 g. (10 mmole) of p-nitrobenzyl 7-[2-thienyl)acetamido]-3-hydroxy-3-cephem-4-carboxylate in 50 ml. of dry N,N-dimethylacetamide were added 2 ml. of propylene oxide. To the solution was added with stirring one equivalent of methanesulfonyl chloride, and stirring was continued for 3 hours. The reaction mixture was then taken up in ethyl acetate, and the solution was washed with a saturated solution of sodium chloride. The washed organic phase was evaporated in vacuo to dryness to obtain the reaction product mixture as a residue. The reaction product was purified by preparative thin layer chromatography on silica gel using for elution 65 percent ethyl acetate/hexane.

The purified product gave the following percent elemental composition on microanalysis.

Calculated for $C_{21}H_{19}N_3O_9S_3$: Theory: C, 45.56; H, 3.46; N, 7.59, S, 17.38; Found: C, 45.74; H, 3.56; N, 7.30; S, 17.06.

The nuclear magnetic resonance spectrum and the infrared absorption spectrum were in agreement with the structure of the title compound.

To 93 mg. of dicyclohexyl-18-crown-6 ether in 15 ml. of acetonitrile (dried over molecular sieves) were added 25 mg. of potassium fluoride which has been dried in vacuo at 90°C. The mixture was stirred for ten minutes, and 138 mg. of p-nitrobenzyl 7-[2-(2-thienyl)acetamido]-3-methylsulfonyloxy-3-cephem-4-carboxylate in 4 ml. of acetonitrile were then added. The mixture was stirred for 1 hour. The mixture was acidified by addition of dilute (5%) HCl, and the resulting acidified mixture was extracted with ethyl acetate. Pure product was obtained from the ethyl acetate extract by preparative thin layer chromatography on silica gel using ethyl acetate:benzene (1:1). Ten mg. of p-nitrobenzyl 7-[2-(2-thienyl)acetamido]-3-fluoro-3-cephem-4-carboxylate were obtained.

I.R.: absorption peaks at 1792, 1740, and 1685 cm.⁻¹
NMR (CDCl₃) showed signals at 6.15 (s, 2H, α—$CH_2$), 4.97 (d, 1H, J = 4 Hz, $C_6$—H), 4.20 (q, 1H, $C_7$—H), 3.52 (d, 1H, $C_7$—NH), 2.32–1.7 (m, 2H, $C_2$—$H_2$) tau.
Fluorine NMR — (d, J = 10 Hz).
M.S.: calculated — 477.0465; found — 477.0455.
Fragment

calculated — 297.0345; found — 297.0344.

EXAMPLE 26 p-Nitrobenzyl 7-amino-3-fluoro-3-cephem-4-carboxylate

Following the side-chain cleavage procedures described by Example 13, the 3-fluoro-3-cephem ester of Example 25 is reacted with phosphorus pentachloride in methylene chloride in the presence of pyridine and the intermediate imino chloride is reacted with isobutanol to provide the 7-amino-3-fluoro-3-cephem-4-carboxylic acid p-nitrobenzyl ester.

EXAMPLE 27

7-(D-α-Phenylglycylamido)-3-fluoro-3-cephem-4-carboxylic acid

By following the deesterification procedures described by Example 14, the nucleus ester of Example 26 is reacted with hydrogen in the presence of prereduced 5 percent Pd/C to provide 7-amino-3-fluoro-3-cephem-4-carboxylic acid.

The product is then acylated by the method described by Example 18 to provide 7-D-α-phenylglycylamido)-3-fluoro-3-cephem-4-carboxylic acid.

EXAMPLE 28

Following the acylation procedure and by employing the acylating reagent of Example 18, the following compounds are prepared by the acylation of the indicated 3-halo nucleus: 7-(D-α-phenylglycylamido)-3-bromo-3-cephem-4-carboxylic acid is prepared with 7-amino-3-bromo-3-cephem-4-carboxylic acid; 7-(D-α-phenylglycylamido)-3-iodo-3-cephem-4-carboxylic acid is prepared with 7-amino-3-iodo-3-cephem-4-carboxylic acid; and 7-[D-α-(4-hydroxyphenyl)-glycylamido]-3-chloro-3-cephem-4-carboxylic acid is prepared with the enamine protected 4-hydroxyphenylglycine mixed anhydride derivative formed with methyl chloroformate via the acylation of 7-amino-3-chloro-3-cephem-4-carboxylic acid.

EXAMPLE 29

7-(D-2-Thienylglycylamido)-3-chloro-3-cephem-4-carboxylic acid is prepared by the N-acylation of 7-amino-3-chloro-3-cephem-4-carboxylic acid with 2-thienylglycyl chloride hydrochloride in acetonitrile and in the presence of propylene oxide.

EXAMPLE 30

7-(D-3-Thienylglycylamido)-3-chloro-3-cephem-4-carboxylic acid is prepared with 7-amino-3-chloro-3-cephem-4-carboxylic acid via N-acylation with D-3-thienylglycyl chloride hydrochloride.

I claim
1. A compound of the formula

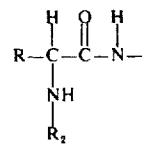

wherein
R is phenyl, hydroxyphenyl, halophenyl, methylphenyl, methoxyphenyl, 2-thienyl, 3-thienyl or 2-furyl;
$R_1$ is hydrogen, benzyl, p-methoxybenzyl, p-nitrobenzyl, diphenylmethyl, 2,2,2-trichloroethyl, trimethylsilyl, or t-butyl;
$R_2$ is hydrogen,

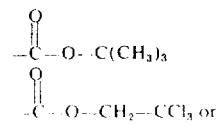

-continued

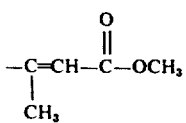

X is fluoro, chloro, bromo or iodo; and the pharmaceutically acceptable, non-toxic salts thereof.

2. The compound of claim 1, wherein $R_2$ is hydrogen.
3. The compound of claim 2, wherein X is chloro.
4. The compound of claim 3 wherein R is phenyl.
5. The compound of claim 4 said compound being 7-(D-phenylglycylamido)-3-chloro-3-cephem-4-carboxylic acid.
6. The compound of claim 3 wherein R is hydroxyphenyl.
7. The compound of claim 6 said compound being 7-(D-4-hydroxyphenylgylcylamido)-3-chloro-3-cephem-4-carboxylic acid.
8. The compound of claim 6 said compound being 7-(D-3-hydroxyphenylglycylamido)-3-chloro-3-cephem-4-carboxylic acid.
9. The compound of claim 3 wherein R is chlorophenyl.
10. The compound of claim 9 said compound being 7-(D-4-chlorophenylglycylamido)-3-chloro-3-cephem-4-carboxylic acid.

* * * * *

UNITED STATES PATENT AND TRADEMARK OFFICE
CERTIFICATE OF CORRECTION

PATENT NO. : 3,925,372
DATED : December 9, 1975
INVENTOR(S) : Robert R. Chauvette It is certified that error appears in the above-identified patent and that said Letters Patent are hereby corrected as shown below:

In column 1, line 24, insert "group" as first word of line.

In column 10, line 8, "than" should read -- then --.

In column 11, line 44, "estrs" should read -- esters --.

In column 13, line 14, "therby" should read -- thereby --.

In column 13, line 26, "fluorphenylsulfonyloxy" should read -- fluorophenylsulfonyloxy --.

In column 15, line 33, "7-acylamido-3halo-" should read -- 7-acylamido-3-halo- --.

In column 27, line 35, "6,90" should read -- 6.90 --.

In column 29, line 55, remove the "j" at end of line.

In column 30, line 4, "pH 5" should read -- pH 6 --.

In column 31, line 11, "7-$\varepsilon$-thienyl)" should read -- 7-$\varepsilon$-(2-thienyl) --.

In column 32, claim 1, the structural formula should read as follows:

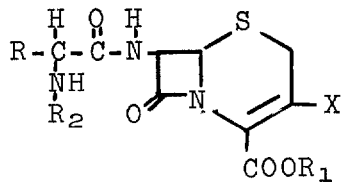

Signed and Sealed this

Third Day of August 1976

[SEAL]

Attest:

RUTH C. MASON
Attesting Officer

C. MARSHALL DANN
Commissioner of Patents and Trademarks